United States Patent
Morishima

(10) Patent No.: US 6,462,871 B1
(45) Date of Patent: *Oct. 8, 2002

(54) STEREOSCOPIC IMAGE DISPLAY APPARATUS USING SPECIFIC MASK PATTERN

(75) Inventor: Hideki Morishima, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,085

(22) Filed: Feb. 17, 1998

(30) Foreign Application Priority Data

Feb. 18, 1997 (JP) .............................................. 9-051009

(51) Int. Cl.[7] ........................... G02B 27/22; G02B 27/10
(52) U.S. Cl. ....................... 359/463; 359/462; 359/623; 359/624
(58) Field of Search ................................ 359/462, 463, 359/621, 622, 623, 624; 348/59

(56) References Cited

U.S. PATENT DOCUMENTS

| | | | |
|---|---|---|---|
| 3,846,383 A | 11/1974 | Uyama et al. ............... | 526/216 |
| 4,829,365 A | * 5/1989 | Eichenlaub ................... | 359/462 |
| 5,083,199 A | 1/1992 | Borner ......................... | 358/88 |
| 5,101,279 A | 3/1992 | Kurematsu et al. .......... | 358/241 |
| 5,392,140 A | 2/1995 | Ezra et al. ..................... | 359/41 |
| 5,428,366 A | 6/1995 | Eichenlaub ................... | 345/102 |
| 5,465,175 A | 11/1995 | Woodgate et al. ........... | 359/463 |
| 5,537,144 A | 7/1996 | Faris ............................ | 348/58 |
| 5,592,332 A | * 1/1997 | Nishio et al. ................. | 359/621 |
| 5,629,797 A | 5/1997 | Ridgway ...................... | 359/464 |
| 5,663,831 A | 9/1997 | Mashitani et al. ........... | 359/463 |
| 5,833,507 A | 11/1998 | Woodgate et al. ............ | 445/24 |
| 5,875,055 A | 2/1999 | Morishima et al. .......... | 359/465 |
| 5,943,166 A | 8/1999 | Hoshi et al. .................. | 359/475 |
| 6,309,691 B1 | 10/2001 | Hasegawa ..................... | 427/8 |

FOREIGN PATENT DOCUMENTS

| | | |
|---|---|---|
| EP | 0 788 008 A1 | 8/1997 |
| EP | 0 827 350 A2 | 3/1998 |
| GB | 1040415 | 8/1966 |
| GB | 80-89678 C | 4/1980 |
| WO | WO 94/06249 | 3/1994 |

OTHER PUBLICATIONS

Neufeldt, Victoria. Webster's New World Dictionary Third College Edition. Simon & Schuster, Inc., New York, New York, p. 831, Dec. 1988.*

Pending U.S. Application Ser. No. 08/791,703, Filed: Jan. 30, 1997, Group Art Unit 2615 ,Applicants: Naosato Taniguchi, Hiroyasu Nose, Toshiyuki Sudo, Hideki Morishima, Kazutaka Inoguchi, For: Stereoscopic Image Display Apparatus Whose Observation Area is Widened.

* cited by examiner

Primary Examiner—Cassandra Spyrou
Assistant Examiner—Jennifer Winstedt
(74) Attorney, Agent, or Firm—Morgan & Finnegan, LLP

(57) ABSTRACT

This invention provides a stereoscopic image display apparatus, which allows the observer to satisfactorily observe a plurality of stereoscopic images from a plurality of positions by appropriately setting individual elements such as two lenticular lenses having refractive power in orthogonal directions, a mask pattern on which aperture portions and light-shielding portions are arranged at predetermined pitches, a display for dividing a plurality of parallax images into a large number of horizontal stripe-shaped parallax images and displaying the plurality of horizontal stripe-shaped parallax images at predetermined pitches in the vertical direction, and the like, upon observing a stereoscopic image using the lenticular lenses.

8 Claims, 20 Drawing Sheets

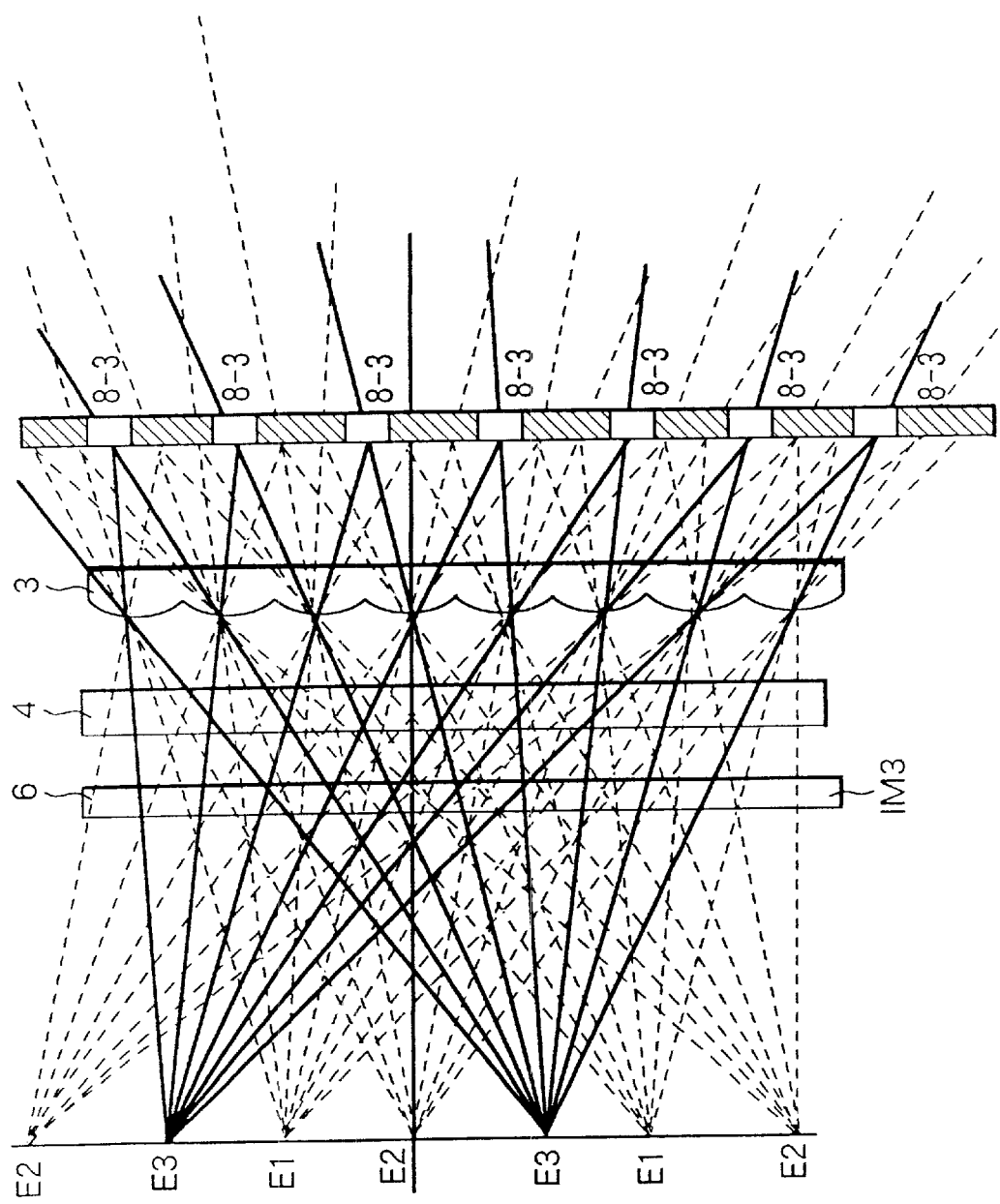

FIG.5A
FIRST VIEW POINT IMAGE

| IM1 |
|---|
| IM1 |
| IM1 |
| IM1 |
| IM1 |
| IM1 |
| IM1 |
| IM1 |
| IM1 |
| IM1 |
| IM1 |
| IM1 |
| IM1 |
| IM1 |
| IM1 |
| IM1 |
| IM1 |
| IM1 |

FIG.5B
SECOND VIEW POINT IMAGE

| IM2 |
|---|
| IM2 |
| IM2 |
| IM2 |
| IM2 |
| IM2 |
| IM2 |
| IM2 |
| IM2 |
| IM2 |
| IM2 |
| IM2 |
| IM2 |
| IM2 |
| IM2 |
| IM2 |
| IM2 |
| IM2 |

FIG.5C
THIRD VIEW POINT IMAGE

| IM3 |
|---|
| IM3 |
| IM3 |
| IM3 |
| IM3 |
| IM3 |
| IM3 |
| IM3 |
| IM3 |
| IM3 |
| IM3 |
| IM3 |
| IM3 |
| IM3 |
| IM3 |
| IM3 |
| IM3 |
| IM3 |

FIG.5D
HORIZONTAL STRIPE SYNTHESIZED IMAGE

| IM1 |
|---|
| IM2 |
| IM3 |
| IM1 |
| IM2 |
| IM3 |
| IM1 |
| IM2 |
| IM3 |
| IM1 |
| IM2 |
| IM3 |
| IM1 |
| IM2 |
| IM3 |
| IM1 |
| IM2 |
| IM3 |

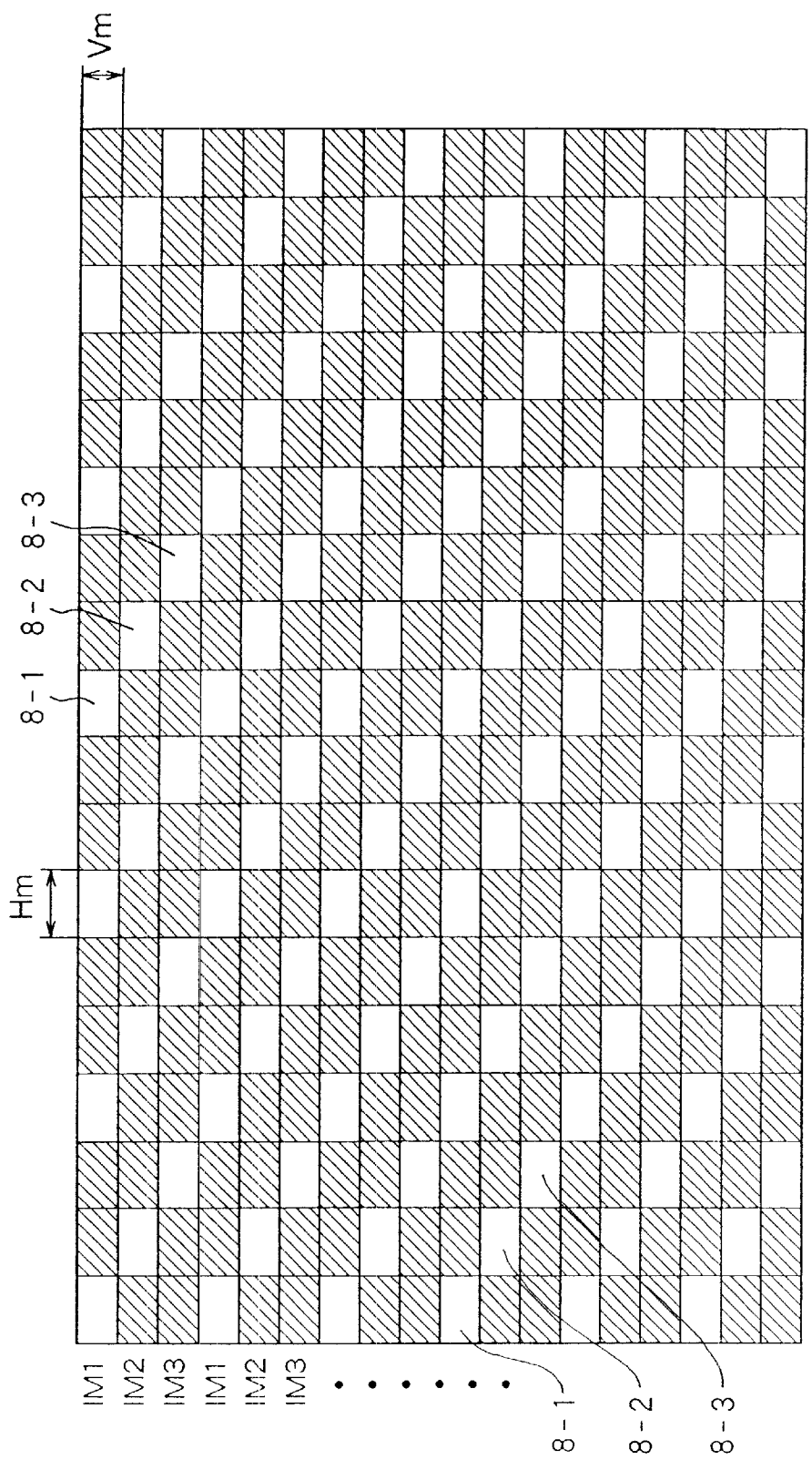

FIG.15A

| |
|---|
| IM1 |
| IM2 |
| IM3 |
| IM1 |
| IM2 |
| IM3 |
| IM1 |
| IM2 |
| IM3 |
| IM1 |
| IM2 |
| IM3 |
| IM1 |
| IM2 |
| IM3 |

FIG.15B

| |
|---|
| IM2 |
| IM3 |
| IM1 |
| IM2 |
| IM3 |
| IM1 |
| IM2 |
| IM3 |
| IM1 |
| IM2 |
| IM3 |
| IM1 |
| IM2 |
| IM3 |
| IM1 |

FIG.15C

| |
|---|
| IM3 |
| IM1 |
| IM2 |
| IM3 |
| IM1 |
| IM2 |
| IM3 |
| IM1 |
| IM2 |
| IM3 |
| IM1 |
| IM2 |
| IM3 |
| IM1 |
| IM2 |

STEREOSCOPIC IMAGE DISPLAY APPARATUS USING SPECIFIC MASK PATTERN

BACKGROUND OF THE INVENTION

The present invention relates to a stereoscopic image display apparatus and, more particularly, to a stereoscopic image display apparatus suitably used for stereoscopically displaying image information on a display device (display) such as e.g., a television, video, computer monitor, game machine, or the like, and stereoscopically observing the image information from a predetermined observation region. As conventional stereoscopic image observation methods, a method of observing parallax images based on different polarization states using, e.g., polarization spectacles, a method of guiding a predetermined one of a plurality of parallax images (viewing position images) to the eyeballs of the observer using a lenticular lens, and the like have been proposed.

In a stereoscopic image display apparatus that uses the above-mentioned polarization spectacles as the stereoscopic image observation method, parallax images from different viewing positions corresponding to the right and left eyes of the observer are displayed on a display, so that the images for the right and left eyes have different polarization states to attain stereoscopic recognition. The images for the right and left eyes are separated and observed via the polarization spectacles. At this time, as a practical method of obtaining different polarization states, a liquid crystal shutter is arranged on the display side to switch the polarization states in synchronism with the field signal of the image to be displayed on the display, and the observer who wears the polarization spectacles time-divisionally and separately observes the right and left images eye by eye, thus attaining stereoscopic viewing. However, in the stereoscopic image display apparatus using this method, the observer must always wear the polarization spectacles.

In contrast to this, in a stereoscopic image display apparatus using a lenticular lens, that allows observation of a stereoscopic image without using any polarization spectacles, since the lenticular lens is arranged in front of the display to spatially separate images for the right and left eyes of the observer, it is easy for the observer to observe a stereoscopic image.

FIG. 20 is a partial schematic sectional view showing principal part of a conventional stereoscopic image display apparatus for observing a stereoscopic image using a lenticular lens. FIG. 20 is a sectional view of principal part from the direction over the head of the observer.

In FIG. 20, reference numeral 101 denotes a liquid crystal display, which has a glass substrate, color filters, electrodes, polarization plates, backlight, and the like (not shown). Reference numeral 101a denotes a display image (display pixel portion) on the liquid crystal display. The display pixel portion 101a consists of aperture portions 102 at which color filters that form pixels are disposed, and black matrices 103 which separate adjacent pixels. A lenticular lens 104 is arranged on the surface of the liquid crystal display 101, and consists of cylindrical lenses each of which has a semi-circular section, as shown in FIG. 20, and extends in a direction perpendicular to the plane of drawing. The display pixel portion 101a of the liquid crystal display 101 is located at the focal plane of the lenticular lens 104.

As shown in FIG. 20, pairs of stripe-shaped right-hand left-eye images (R) and (L) are alternately arranged on the display pixel portion 101a in correspondence with the pitches of the lenticular lens 104, and are optically separately imaged on a right eye $E_R$ and left eye $E_L$ of the observer via the lenticular lens 104, thus realizing stereoscopic viewing.

FIG. 20 shows spatial regions where the right- and left-eye images can be respectively observed via a lenticular lens portion 104a at the central portion of the liquid crystal display 101, and as for other lenticular lens portions, right and left separated spatial regions overlap each other at the right and left eye positions of the observer, so that right and left parallax images can be evenly separately observed over the entire screen. With this method, the observation positions of the right and left parallax images alternately and repetitively appear a large number of times in the observation region.

SUMMARY OF THE INVENTION

In a stereoscopic 3D display apparatus which does not require any eyewears such as polarization eyeglasses as the one for observing a stereoscopic image, the horizontal width of each of viewing zones for the right and left eyes is nearly equal to the interval between the eyes or bigger.

In such arrangement, the right and left parallax images may reach the left and right eyes depending on the face position of the observer, and may cause so-called inverse stereoscopic viewing. For this reason, the observer can only horizontally move his or her head by a maximum of about 65 mm corresponding to the interval between the eyes.

It is an object of the present invention to provide a stereoscopic 3D display apparatus which allows the observer to satisfactorily observe a plurality of stereoscopic images from a plurality of positions by appropriately setting individual elements such as two lenticular lenses running perpendicular to each other, a mask pattern on which aperture portions and light-shielding portions are arranged at predetermined pitches, a display for dividing a plurality of parallax images into a large number of horizontal stripe-shaped parallax images and displaying the plurality of horizontal stripe-shaped parallax images at predetermined pitches in the vertical direction, and the like, upon observing a stereoscopic image using the lenticular lenses.

In order to solve the above-mentioned problems and to achieve the above object, the present invention comprises the following arrangement.

That is, an image display apparatus according to the present invention comprises: a light source device; a mask pattern which has line patterns each obtained by repetitively arranging N−1 or N light-shielding portions with respect to one aperture portion in a horizontal direction, and has sets each of which includes N line patterns shifted from each other in the horizontal direction by a width of the aperture portion, and which are repetitively arranged in the vertical direction; a first lenticular lens formed by arranging a plurality of cylindrical lenses, having refractive power in the horizontal direction, at a predetermined pitch in the horizontal direction; a second lenticular lens formed by arranging a plurality of cylindrical lenses, having refractive power in the vertical direction, at a predetermined pitch in the vertical direction; and a display for displaying image information, the display being illuminated by a light beam which is emitted by the light source device, transmitted through the plurality of aperture portions, and passes through the first and second lenticular lenses, and the image information having a horizontal stripe synthesized image obtained by respectively dividing N images (N≧3) into a plurality of horizontal stripe images, and repetitively arranging the divided horizontal stripe images in a predetermined order in correspondence with the N images at a predetermined pitch in the vertical direction.

The stereoscopic image display apparatus of the present invention allows the observer to satisfactorily observe a plurality of stereoscopic images from a plurality of positions by appropriately setting individual elements such as two lenticular lenses having running perpendicular to each other, a mask pattern on which aperture portions and light-shielding portions are arranged at predetermined pitches, a display for dividing a plurality of parallax images into a large number of horizontal stripe-shaped parallax images and displaying the plurality of horizontal stripe-shaped parallax images at predetermined pitches in the vertical direction, and the like, upon observing a stereoscopic image using the lenticular lenses.

Moreover, an image apparatus for allowing observation of image information comprises: light providing means for providing patterned light which has line unit areas each having light-existing portions and light-non-existing portions each of which is N−1 or N times the width of one of the light existing portions arranged alternately in a horizontal direction, and has sets each of which includes N line unit areas each of which is shifted from another one in the horizontal direction by a width of the light-existing portions, and which are repetitively arranged in the vertical direction; optical means having a plurality of first cylindrical lens functions, having refractive power in the horizontal direction, positioned to respective areas arranged at a predetermined pitch in the horizontal direction, and a plurality of second cylindrical lens functions, having refractive power in the vertical direction, positioned to respective areas arranged at a predetermined pitch in the vertical direction; display means for displaying image information, the display means being illuminated by a light which is emitted from the light-existing portions of the light providing means and effected by both of the first and second plurality of cylindrical lens functions, and the image information having a horizontal stripe synthesized image obtained by respectively dividing N images (N≧3) into a plurality of horizontal stripe images, and repetitively arranging the divided horizontal stripe images in a predetermined order in correspondence with the N images at a predetermined pitch in the vertical direction.

According to a preferred aspect of the present invention, the first and second lenticular lenses serve to make a light beam coming from one point of the aperture portion of the mask pattern reach a surface of the display to be converted into a collimated light beam in a horizontal section and to be substantially focused in a vertical section.

According to a preferred aspect of the present invention, the apparatus satisfies:

0.95<(Vd/Vm)/(L1/L2)<1.05

0.96<(N×Vd/VL)/{(L1+L2)/2×L2}<1.04

0.9<(1/fv)/(1/L1+1/L2)<1.1 where VL is the vertical arrangement pitch of the plurality of cylindrical lenses of the second lenticular lens, Vd is the vertical arrangement pitch of the plurality of horizontal stripe parallax images to be displayed on the display, Vm is the vertical arrangement pitch of the plurality of line patterns of the mask pattern, L1 is the optical distance from the display to the second lenticular lens, L2 is the optical distance from the second lenticular lens to the mask pattern, and fv is the focal length of the second vertical lens in the vertical direction.

According to a preferred aspect of the present invention, the apparatus satisfies:

0.9<(D/Hm)/(Lh0/Lh1)<1.1

0.9<(N×Hm/HL)/{(Lh0+Lh1)/Lh0}<1.1 where Lh1 is the optical distance from the first lenticular lens to the mask pattern, Lh0 is the optical distance from the first lenticular lens to a predetermined observation surface, HL is the horizontal arrangement pitch of the plurality of cylindrical lenses of the first lenticular lens, Hm is the horizontal pitch of the aperture portions of the mask pattern, and D is the separation distance between adjacent focal points of the N parallax images when light beams based on the N parallax images via the aperture portions of the mask pattern are focused on the observation surface.

According to a preferred aspect of the present invention, the N images are parallax images for N viewing positions, and the apparatus works as a stereoscopic image display to allow observer to observe stereoscopic 3D images.

According to a preferred aspect of the present invention, the numbers N and N2 of viewing positions satisfy:

0.96<(Vd/Vm)/(L1/L2)<1.05

0.96<{(N−N2)×Vd/VL}/{(L1+L2)/2×L2}<1.04

0.9<(1/fv)/(1/L1+1/L2)<1.1 where N2 is the number of viewing positions, at which aperture positions on the mask pattern are set to shield light, of the number N of viewing position, VL is the vertical pitch of the second lenticular lens, Vd is the vertical pitch of a transmission type display, Vm is the vertical pitch of an emission pattern of a spontaneous type display optical element or a mask pattern having aperture and light-shielding portions arranged in a checkerboard pattern, L1 is the distance between the transmission type display and an optical system having a micropatterned structure, L2 is the distance between the optical system having the micropatterned structure, and the checkerboard-like emission pattern of the spontaneous type display optical element or the mask pattern having the aperture and light-shielding portions arranged in the checkerboard pattern, and fv is the focal length of a predetermined horizontally elongated optical unit, which makes up the optical system having the micropatterned structure, in the vertical direction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is an explanatory view of an H-Z section including mask pattern aperture portions for focusing illumination light corresponding to a parallax image IM3 at a third viewing position E3;

FIG. 5A is a view for explaining horizontal stripe images associated with the first viewing position;

FIG. 5B is a view for explaining horizontal stripe images associated with the second viewing position;

FIG. 5C is a view for explaining horizontal stripe images associated with the third viewing position;

FIG. 5D is a view for explaining the method of forming a horizontal stripe synthesized image;

FIG. 6 is a view for explaining a mask pattern in FIG. 1;

FIG. 15A is a view for explaining a first horizontal stripe synthesized image obtained by synthesizing first, second, and third viewing position images using the mask pattern shown in FIG. 14A;

FIG. 15B is a view for explaining a second horizontal stripe synthesized image obtained by synthesizing first, second, and third viewing position images using the mask pattern shown in FIG. 14B;

FIG. 15C is a view for explaining a third horizontal stripe synthesized image obtained by synthesizing first, second, and third viewing position images using the mask pattern shown in FIG. 14C;

DETAILED DESCRIPTION OF THE INVENTION

First Embodiment

Figure 1:
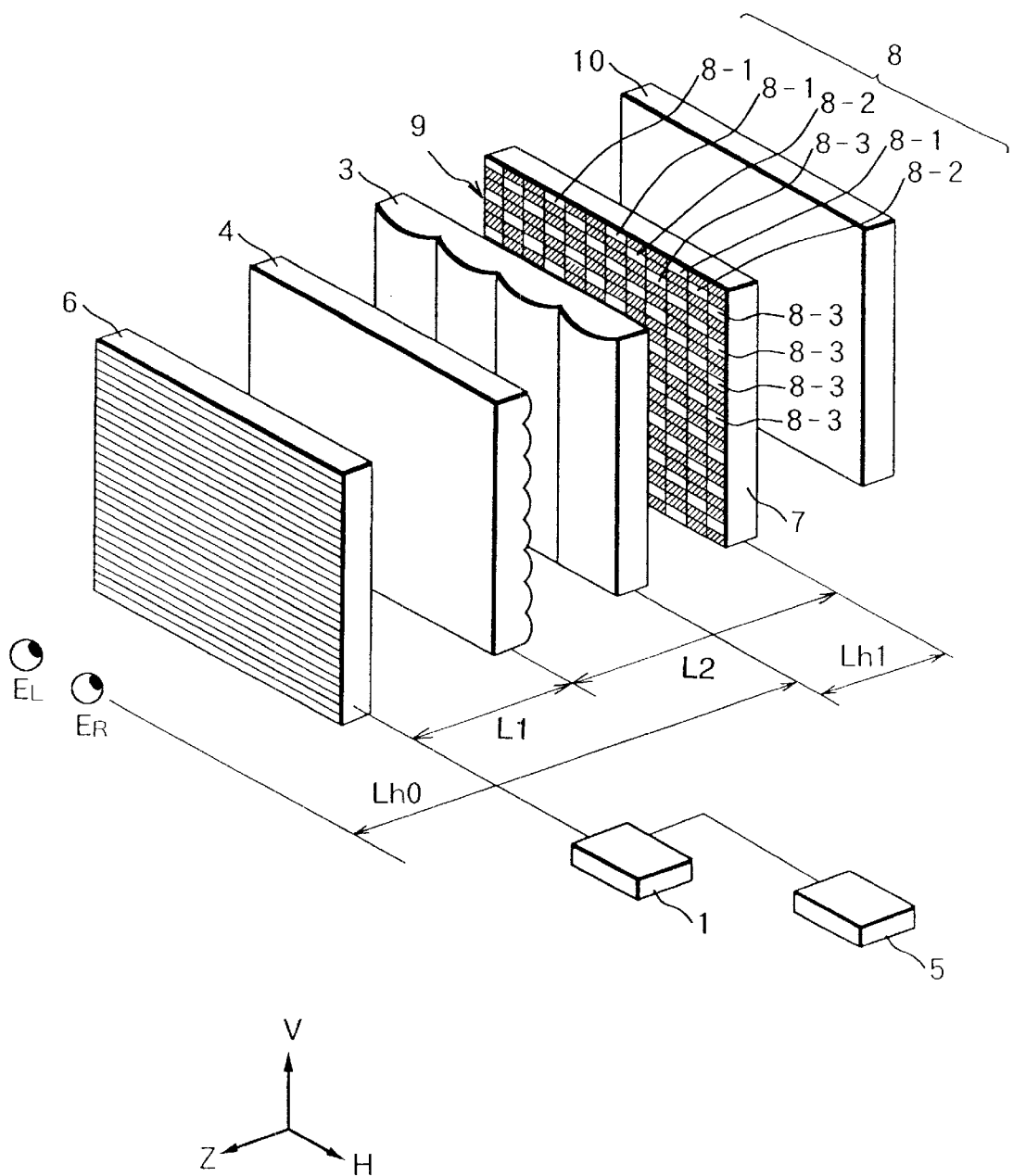
FIG. 1 is a perspective view showing principal part of the first embodiment of the present invention.

FIG. 1 is a perspective view showing principal part of the first embodiment of the present invention. In this embodiment, the number N of a plurality of parallax images is 3. Reference numeral 6 denotes a liquid crystal display (LCD, display device) for displaying an image, which has a cover glass, polarization plate, electrodes, and the like. Reference numeral 10 denotes a backlight panel as an illumination source. A mask substrate 7 is disposed in front of the backlight 10 and is formed with a mask pattern 9 on which aperture portions (apertures) 8 that transmit light are arranged at predetermined pitches in a checkerboard pattern. The mask pattern 9 consists of a metal deposition film of, e.g., chromium or a light absorption member, and is formed by patterning on the mask substrate 7 consisting of glass or resin.

Reference numeral 3 denotes a first lenticular lens (vertical lenticular lens) formed by horizontally arranging a plurality of cylindrical lenses having refractive power in a horizontal direction H; and 4, a second lenticular lens (horizontal lenticular lens) formed by vertically arranging cylindrical lenses having refractive power in a vertical direction V. The first and second lenticular lenses 3 and 4 are inserted in an arbitrary order between the mask substrate 7 and the liquid crystal display 6 for displaying an image.

The liquid crystal display 6 displays three parallax images (three images) corresponding to three viewing positions in turn as horizontal stripe images, as will be described later. Reference numeral 1 denotes a display driving circuit for displaying a horizontal stripe synthesized image on the display 6. Reference numeral 5 denotes an image processing circuit. The circuit 5 extracts a large number of horizontal stripe parallax images (parallax images) from a plurality of parallax images of a three-dimensional object obtained from a plurality of viewing positions, generates a horizontal stripe synthesized image by vertically and repetitively arranging the extracted images at predetermined pitches in a predetermined order, and inputs the synthesized image to the display driving circuit 1.

Light coming from the backlight panel 10 is transmitted through the aperture portions 8 of the mask substrate 7, and illuminates the liquid crystal display 6 via the first and second lenticular lenses 3 and 4, which separate a plurality of parallax images displayed on the display 6 at predetermined observation positions $E_R$ and $E_L$ in front of the display 6, thus allowing observation of a stereoscopic image.

Figure 2:
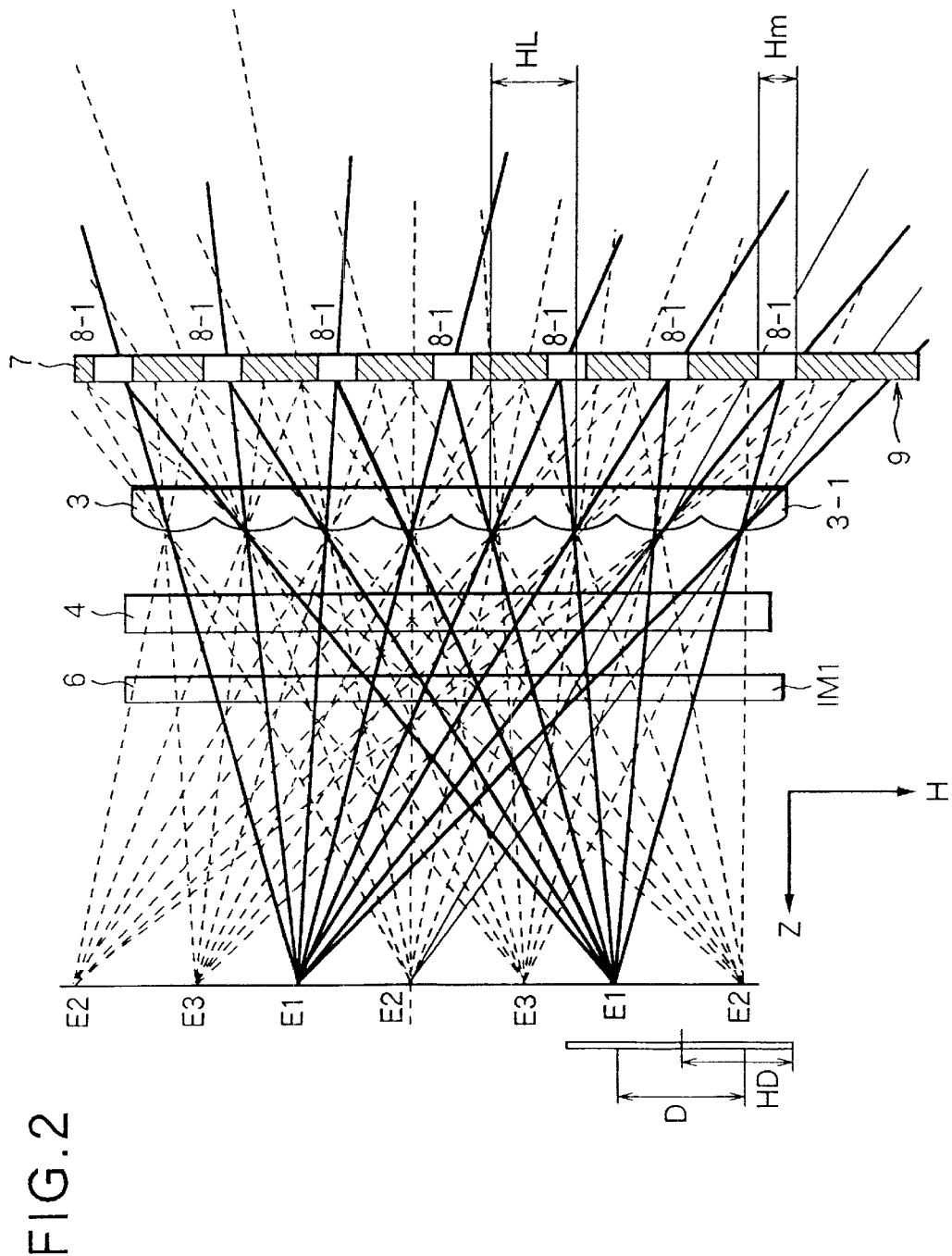
FIG. 2 is an explanatory view of an H-Z section including mask pattern aperture portions for focusing illumination light corresponding to a parallax image IM1 at a first viewing position E1.
Figure 3:
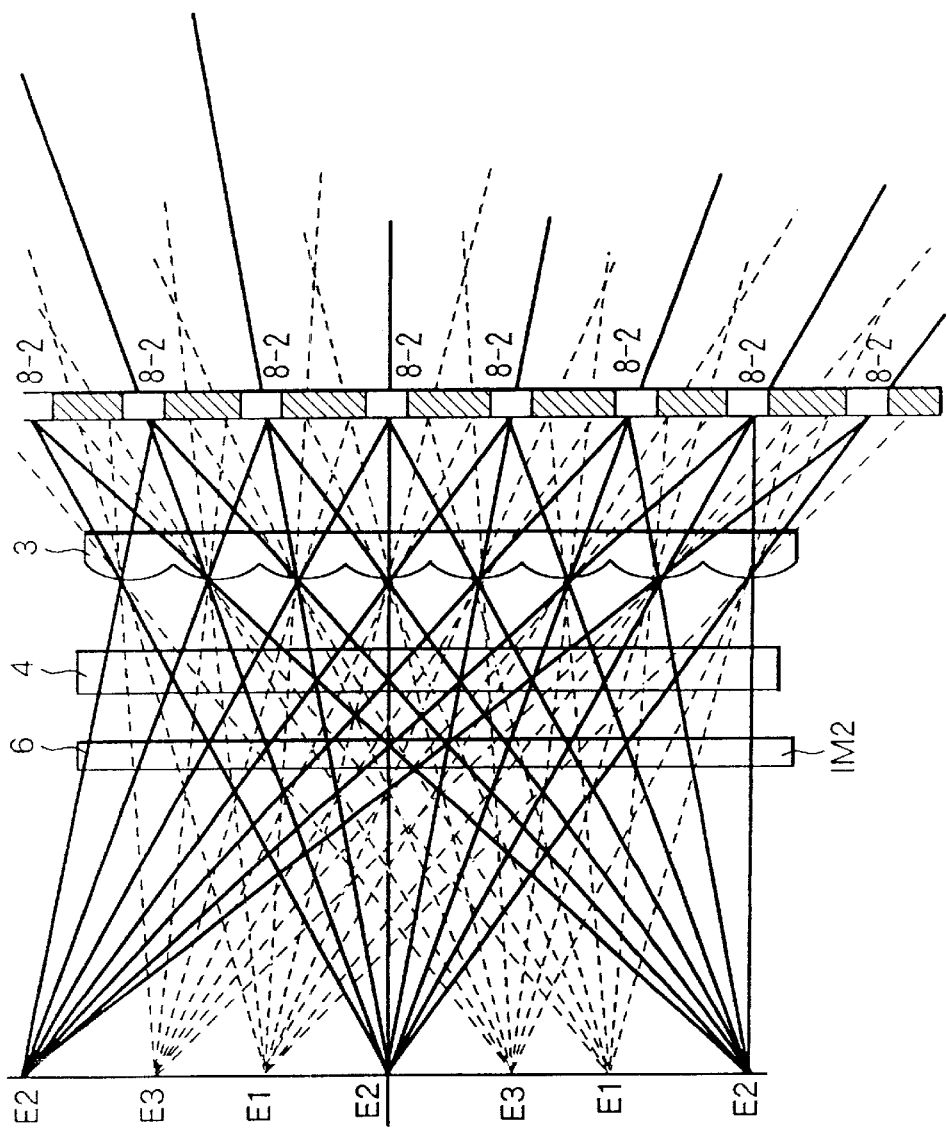
FIG. 3 is an explanatory view of an H-Z section including mask pattern aperture portions for focusing illumination light corresponding to a parallax image IM2 at a second viewing position E2.

FIGS. 2 to 4 are explanatory views showing the principle of horizontally separately observing parallax images corresponding to three viewing positions E1, E2, and E3 at the observation position in front of the display 6 in FIG. 1, and show the section when the stereoscopic 3D display apparatus show in FIG. 1 is viewed from the above. FIGS. 5A to 5C are explanatory views of a plurality of parallax images IM1, IM2, and IM3 to be displayed on the display 6. FIGS. 2, 3, and 4 are horizontal sectional views respectively including single line patterns having the aperture portions 8 of the mask pattern 9 in the horizontal direction H, which focus illumination light based on the parallax images IM1, IM2, and IM3 at first, second, and third viewing positions E1, E2, and E3.

In FIG. 2, a light beam coming from the backlight panel 10 illuminates the mask substrate 7, and emerges from a plurality of apertures 8-1 arranged in a single line pattern. The first lenticular lens 3 (the second lenticular lens 4 is illustrated as a flat plate since it does not have any refractive power in the horizontal direction) is inserted between the mask substrate 7 and the LCD 6, and its curvature is designed so that the mask pattern 9 is located at nearly the focal point positions of individual cylindrical lenses 3-1. A pair of aperture (8-1) and light-shielding portion of the mask pattern 9 nearly correspond to horizontal pitch of the cylindrical lens 3-1 of the first lenticular lens 3. Illumination light beams coming from a linear (horizontal) aperture array (line pattern) defined by the aperture portions 8-1 and light-shielding portions on the mask substrate 7 shown in FIG. 2 are converted into nearly collimated light beams that point in a given direction, as described above, illuminate the first parallax image IM1 of three parallax images (horizontal stripe parallax images) which are vertically and cyclically displayed on the liquid crystal display 6, and are focused near the first viewing position E1.

Similarly, a linear aperture array defined by aperture portions 8-2 and light-shielding portions on the mask substrate 7 shown in FIG. 3 is offset downward (in the direction V) by one line on the plane of drawing from the linear aperture array shown in FIG. 2 above, and has a pattern obtained by spatially shifting the pattern of the aperture and light-shielding portions shown in FIG. 2 by a ⅓ pitch in the horizontal direction H. That is, the linear aperture array show in FIG. 3 has a pattern shifted by the width of one aperture portion from that shown in FIG. 2. Illumination light beams from the aperture portions 8-2 are similarly converted into nearly collimated light beams that point in a given direction different from that in FIG. 2 by the first lenticular lens 3, illuminate the second parallax image IM2 of the three horizontal stripe parallax images which are vertically and cyclically displayed on the liquid crystal display 6, and are focused at the second viewing position E2. The same applies to FIG. 4.

More specifically, light beams leaving the aperture portions 8 on the mask substrate 7 are converted into nearly collimated light beams via the first lenticular lens 3, illuminate the first, second, and third parallax images on the liquid crystal display 6 to have directivities within the ranges indicated by the solid lines in the corresponding figures, and are then focused at the viewing positions E1, E2, and E3.

In this embodiment, the pitch (horizontal pitch) of the first lenticular lens 3 is set to be slightly smaller than that of the pitch of the aperture and light-shielding portions in the three horizontal lines corresponding to the three viewing positions on the mask pattern 9.

More specifically, let Lh1 be the optical distance between the mask pattern 9 and first lenticular lens 3, Lh0 be the optical distance between the first lenticular lens 3 and observation surface, HL be the horizontal pitch of the first lenticular lens 3 (in this embodiment, the pitch is defined by the length of one element in a predetermined direction; the same applies to the following description), Hm be the horizontal pitch of the mask pattern 9, and D be the separation distance between adjacent viewing positions on the observation surface. Then, the individual parameters are defined to satisfy:

$$0.9 < (D/Hm)/(Lh0/Lh1) < 1.1 \quad (1)$$

$$0.9 < (N \times Hm/HL)/\{(Lh0+Lh1)/Lh0\} < 1.1 \quad (2)$$

As the separation distance D, 65 mm as the standard eye interval are selected. In this embodiment, since the horizontal width HD of the illumination region corresponding to each of the viewing positions E1, E2, and E3 equals the separation distance D, if the interval between the two eyes is used as the separation distance D, both eyes of a person cannot fall within the horizontal width of the illumination region corresponding to each viewing position. Therefore, if the head of the observer is located at the illumination region corresponding to each viewing position, the observer can observe two corresponding viewing position images.

FIGS. 5A to 5D are explanatory views showing the method for synthesizing three parallax images corresponding to the three viewing positions E1, E2, and E3 into a stripe pattern. The images IM1, IM2, and IM3 at the three viewing positions are respectively horizontally divided into a large number of horizontal stripe parallax images in correspondence with the line width of the LCD 6. For example, every (3n+1)-th lines (n=0, 1, 2, ...) of images like the first line, fourth line, seventh line, ..., are extracted from the first parallax image IM1 shown in FIG. 5A, every (3n+2)-th lines (n=0, 1, 2, ...) of images like the second line, fifth line, eighth line, ..., are extracted from the second parallax image IM2 shown in FIG. 5B, and every (3n)-th lines (n=1, 2, ...) of images like the third line, sixth line, ninth line, ..., are extracted from the third parallax image IM3 shown in FIG. 5C, thus forming a single horizontal stripe synthesized image, as shown in FIG. 5D.

FIG. 6 is an explanatory view showing the pattern state of the mask pattern 9 corresponding to the three parallax images IM1, IM2, and IM3. Line patterns, in each of which the aperture portions 8-1 (8-2 or 8-3) corresponding to each viewing position, and light-shielding portions are repetitively arranged in the horizontal direction, are cyclically arranged in the vertical direction. One horizontal line forms one line pattern.

Figure 7:
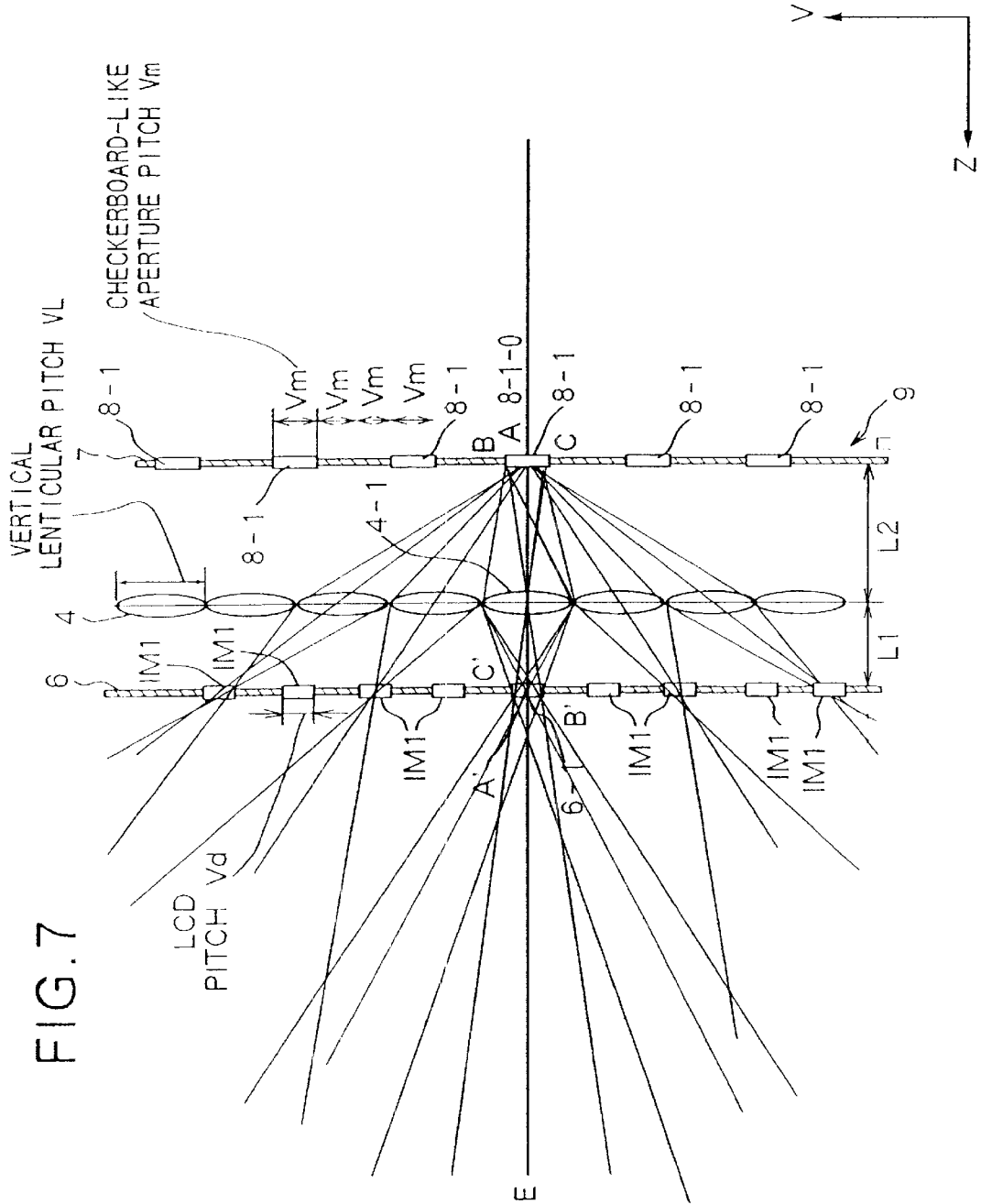
FIG. 7 is a view for explaining a V-Z section in association with a stereoscopic image display apparatus shown in FIG. 1.

FIG. 7 is a schematic sectional view in the vertical direction (V) of the stereoscopic image display apparatus of the present invention. The vertical observation region will be explained below with the aid of FIG. 7.

In FIG. 7, the first lenticular lens 3 having no optical effect in this section, and the substrate consisting of plane glass which is not directly associated with any optical effect are not shown, and the second lenticular lens 4 is schematically illustrated. The apertures on the mask pattern 9 of the mask substrate 7 form a pattern shown in FIG. 1, and in the vertical direction, the respective lines are shifted from each other by a ⅓ pitch (⅓ pitch-equal to Vm which is explained below) in the horizontal direction in correspondence with the three parallax images cyclically displayed as the horizontal stripe parallax images on the liquid crystal display 6 in the vertical direction.

Line patterns on the mask pattern 9 in FIG. 7 illuminate parallax image lines for one viewing position of the three parallax images IM1, IM2, and IM3. FIG. 7 exemplifies the section for displaying line patterns of the parallax image IM1 corresponding to the first viewing position. Portions painted in black other than the apertures 8-1 are light-shielding portions that shield light. On the LCD 6, each region that displays the stripe-shaped first parallax image IM1 corresponding to the first viewing position is painted in white, and each region for displaying a stripe-shaped parallax image corresponding to the second or third parallax image IM2 or IM3 is painted in black.

Let Vm be the vertical pitch of the apertures 8-1 on the mask pattern 9, VL be the pitch of the second lenticular lens 4, fv be the focal length of each cylindrical lens that forms the second lenticular lens 4 within the plane of drawing of FIG. 7, Vd be the pixel pitch on the liquid crystal display 6 in the vertical direction (V), L1 be the distance from the display surface of the liquid crystal display 6 to the second lenticular lens 4, and L2 be the distance from the second lenticular lens 4 to the mask pattern 9. Then, these parameters are set to satisfy:

$$0.95 < (Vd/Vm)/(L1/L2) < 1.05 \quad (3)$$

$$0.96 < (N \times Vd/VL)/\{(L1+L2)/2 \times L2\} < 1.04 \quad (4)$$

$$0.9 < (1/fv)/(1/L1+1/L2) < 1.1 \quad (5)$$

At this time, six light beams originating from one point of the aperture 8 on the mask pattern 9 are focused on the corresponding pixel lines IM1 as caustic curves perpendicular to the plane of drawing of FIG. 7. Paying attention to one of the apertures 8-1 of the line pattern corresponding to the first viewing position of the mask pattern 9, a light beam originating from a central point A of a central aperture 8-1-0 in FIG. 7 and entering a corresponding cylindrical lens 4-1 of the second lenticular lens 4 is focused on the dotted line on a central point A' of a corresponding pixel array 6-1 on the LCD 6. Light beams that originate from the central point A of the central aperture 8-1-0 and enter cylindrical lenses of the lenticular lens 4 other than the cylindrical lens 4-1 are focused as caustic curves at the centers of other pixel lines that display the first parallax image lines IM1.

On the other hand, light beams that originate from end points B and C of the aperture 8-1-0 and enter the corresponding cylindrical lens 4-1 of the second lenticular lens 4 are respectively focused as caustic curves on end points B' and C' of the pixel array 6-1. Similarly, light beams that originate from other points of the aperture 8-1-0 and enter the cylindrical lens 4-1 are focused as caustic curves on the pixel array 6-1 on the LCD 6. Also, all light beams coming from the apertures 8-1 and enter cylindrical lenses other than the cylindrical lens 4-1 are focused on pixel lines that display the first parallax image lines on the LCD 6.

Likewise, all light beams coming from aperture portions in the checkerboard pattern other than the aperture 8-1-0 are focused on pixel lines IM1 that display the first parallax image lines on the LCD 6 to illuminate first parallax pixel lines IM1 of the LCD 6. After that, these light beams are transmitted through these lines and diverge in only the vertical direction in accordance with their NA(numerical aperture)s upon focusing, thus obtaining an observation region where the first parallax image is evenly separated and observed over the total vertical width of the screen from a predetermined eye height of the observer. In the above description, the first parallax image IM1 at the observation position has been described, but the same applies to the parallax images IM2 and IM3 corresponding to the second and third viewing positions.

As an example of the arrangement of this embodiment, let Vm be the vertical pitch of the apertures 8 on the mask pattern 9, VL be the pitch of the cylindrical lenses of the lenticular lens 4, Vd be the vertical pixel pitch of the liquid crystal display 6, L1 be the distance from the display surface of the liquid crystal display 6 to the principal plane of the second lenticular lens 4 on the observer side, L2 be the distance from the display surface of the liquid crystal display 6 to the principal plane of the second lenticular lens 4 on the mask substrate 7 side, and fv be the focal length of each cylindrical lens that builds the second lenticular lens 4 within the plane of drawing of FIG. 7. Then, relations (3), (4), and (5) above hold.

For example, $3 \cdot Vd = 3 \cdot Vm = VL$, $L1 = L2$, and $fv = L1/2$ are set to obtain the observation region where images corresponding to the individual viewing positions are evenly separated and observed over the total vertical width of the screen from a predetermined eye height of the observer, as has already been described above with the aid of FIG. 7. As shown in FIGS. 2 to 4, at the three viewing positions E1, E2, and E3, two of the parallax images IM1, IM2, and IM3 can be observed.

In this embodiment, the number of lines of each parallax image is set to be 15 for the sake of simplicity. However, in practice, a display ordinarily has more than 500 lines, and the individual images can be visually confirmed at the respective viewing positions.

In this embodiment, the image display apparatus is built by disposing the LCD 6, second lenticular lens 4, first lenticular lens 3, and mask pattern 9 in the order named when viewed from the observer side. However, even when the first and second lenticular lenses 3 and 4 replace each other, a stereoscopic image display apparatus can be similarly built as long as the pitches and focal lengths of the first and second lenticular lenses 3 and 4 and the vertical and horizontal pitches of the apertures 8 on the mask pattern 9 are set again to satisfy all the conditions described so far.

In this embodiment, a light beam pattern having directivity is formed using the light source 1 and mask pattern 9. Alternatively, even when a light beam pattern formed by a spontaneous emission element such as a CRT or the like is used, the stereoscopic image display apparatus of this embodiment can be similarly obtained.

In this embodiment, the number N of viewing positions is set to be 3. However, the number of viewing positions may be increased within the range in which the display resolution does not pose any problems in actual use.

This embodiment uses a horizontal stripe synthesized image obtained by dividing, into horizontal lines, parallax images of a three-dimensional object viewed from three viewing positions corresponding to the first, second, and third viewing positions, and cyclically synthesizing these divided lines in the vertical direction. In this embodiment, the separation distance D in FIGS. 2 to 4 is set at 65 mm equal to the distance between the eyes of human being. The horizontal pitch Hm of the mask pattern 9 and horizontal pitch HL of the first lenticular lens 3 are set in accordance with relations (1) and (2) above.

Figure 8:
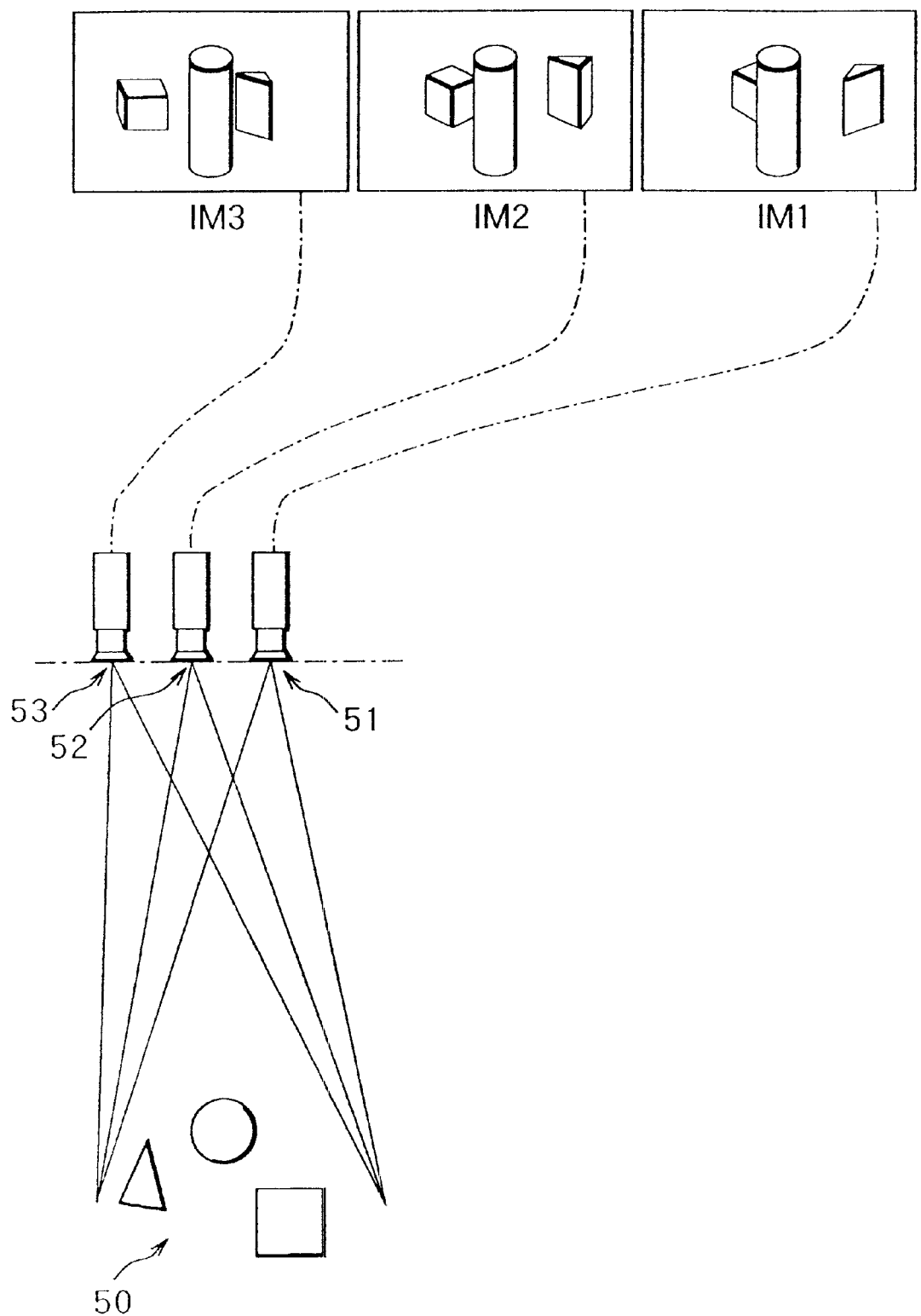
FIG. 8 is a view for explaining the method of photographing a three-dimensional object in the first embodiment of the present invention.

FIG. 8 is a view for explaining a method of forming a synthesized image by photographing three-dimensional objects 50 from different viewing positions using three TV cameras 51 to 53 to obtain three parallax images IM1, IM2, and IM3 at three different viewing positions, dividing these parallax images into horizontal lines to obtain a large number of horizontal stripe parallax images, and synthesizing these horizontal lines.

The three-dimensional objects 50 are photographed by the TV cameras 51, 52, and 53 corresponding to the first, second, and third viewing positions to obtain corresponding parallax images IM1, IM2, and IM3. A horizontal stripe synthesized image is generated based on the three parallax images IM1, IM2, and IM3 by the same method shown in FIGS. 5A to 5D, and is displayed on the LCD 6.

Figure 9:
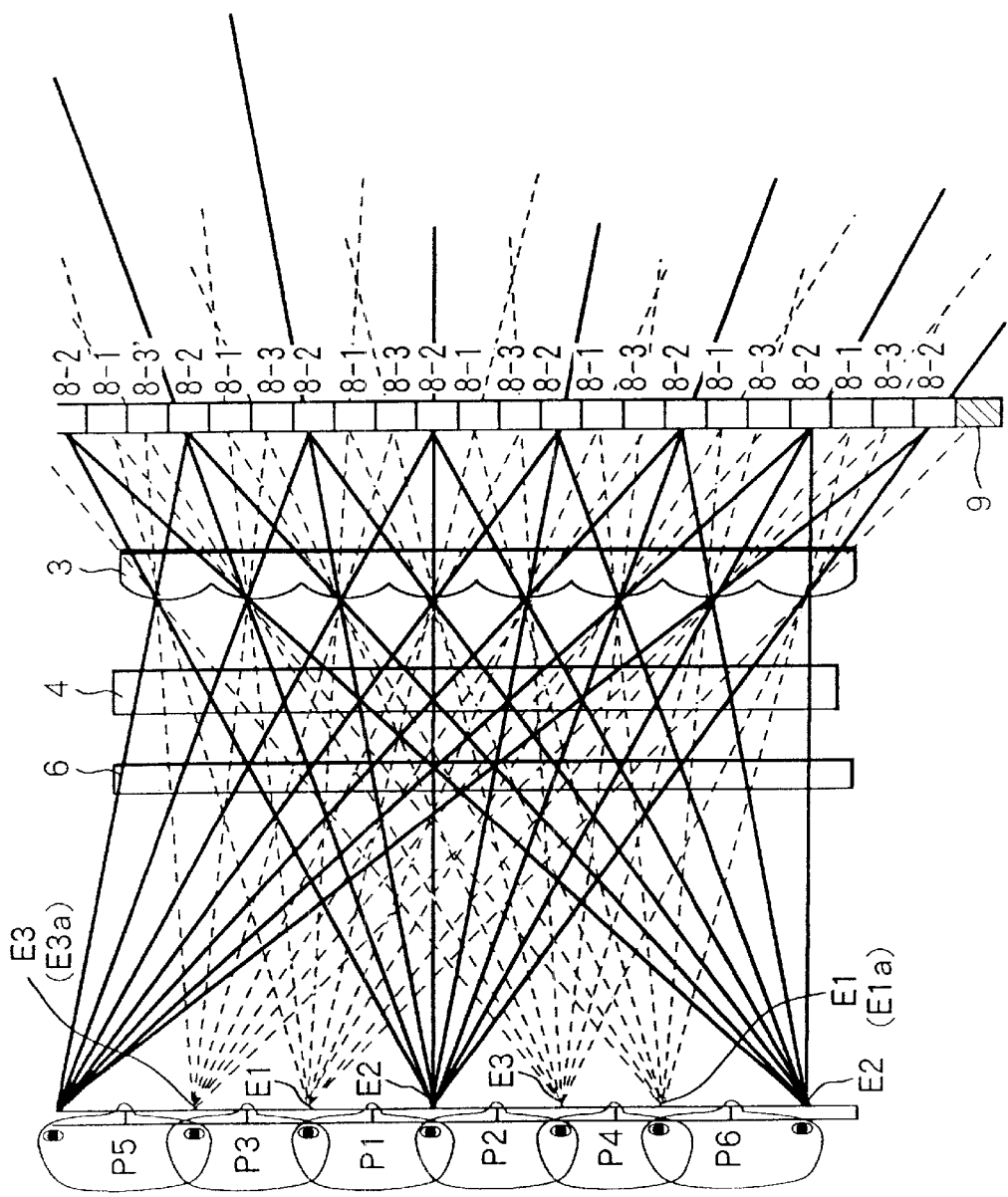
FIG. 9 is a view for explaining the relationship between the position of the observer observing a stereoscopic image, and the stereoscopic image observed, in the first embodiment of the present invention.

FIG. 9 is a view for explaining the relationship between the head position of the observer and the stereoscopic image upon observing the stereoscopic image using the stereoscopic image display apparatus of this embodiment. In FIG. 9, the apertures 8-1, 8-2, and 8-3 of the mask pattern 9 corresponding to the first, second, and third viewing positions are illustrated in a single plane for the sake of simplicity, but the individual aperture arrays are cyclically and separately arranged in the direction perpendicular to the plane of drawing in practice.

Illumination regions of the viewing positions E1, E2, and E3 are cyclically and repetitively formed, as shown in FIG. 9, and the separation distance D between adjacent regions is set at 65 mm. When the observer's head is located at an observation position P1, the image IM1 corresponding to the first viewing position reaches the left eye, and the image IM2 corresponding to the second viewing position reaches the right eye. As a consequence, the observer can observer a stereoscopic image similar to that obtained when his or her head is located between the TV cameras 51 and 52 in FIG. 8. On the other hand, when the observer's head is located at an observation position P2, the image IM2 corresponding to the second viewing position reaches the left eye, and the image IM3 corresponding to the third viewing position reaches the right eye. As a consequence, the observer can observer a stereoscopic image similar to that obtained when his or her head is located between the TV cameras 52 and 53 in FIG. 8.

Even when the observer horizontally moves within the 2×65 mm range from a position where the left eye is located at the left end of the viewing position E1 and the right eye is located at the left end of the viewing position E2 to a position where the left eye is located at the right end of the viewing position E2 and the right eye is located at the right end of the viewing position E3, he or she can observe a stereoscopic image without causing any inverse stereoscopic viewing. When the observer's head is located at an observation position P3 or P4, images that are to reach the right and left eyes are inverted to cause inverse stereoscopic viewing. However, when the observer further moves to an observation position P5 or P6, he or she can observe a normal stereoscopic image again.

In this embodiment, the number N of viewing positions is set to be 3. However, when the number N of viewing positions is increased, if the separation interval D between adjacent viewing positions is maintained at 65 mm, the horizontal head movement up to (N−1)×65 mm never cause any inverse stereoscopic viewing.

In this embodiment, the three parallax images IM1, IM2, and IM3 are displayed on the display 6 as horizontal stripe parallax images to attain stereoscopic observation. In place of the three parallax images, three different plane images may be simply displayed as horizontal stripe images, and the separation distance D shown in FIGS. 2 to 4 may be set to be larger than the interval between the eyes, i.e., about D=80 mm, so that light beams from only one of three viewing positions E1, E2, and E3 enter the two eyeballs of the observer. With this arrangement, at different positions on the screen of the display 6, the observer can observe one of the different plane images.

For example, the viewing positions E1, E2, and E3 are cyclically set, as shown in FIGS. 2 to 4, and the separation distance D between adjacent viewing positions is set at D=80 mm. With this arrangement, the first image corresponding to the first viewing position E1 on horizontal stripes displayed on the liquid crystal display 6 is observed within only the range near the first viewing position E1, the second image corresponding to the second viewing position E2 is observed within only the range near the second viewing position E2, and the third image corresponding to the third viewing position E3 is observed within only the range near the third viewing position E3.

In summary, the stereoscopic image display apparatus of this embodiment allows the observer to satisfactorily observe a plurality of stereoscopic images from a plurality of positions by appropriately setting individual elements such as two lenticular lenses having refractive power in orthogonal directions, a mask pattern on which aperture portions and light-shielding portions are arranged at predetermined pitches, a display for dividing a plurality of parallax images into a large number of horizontal stripe-shaped parallax images and displaying the plurality of horizontal stripe-shaped parallax images at predetermined pitches in the vertical direction, and the like, upon observing a stereoscopic image using the lenticular lenses.

Second Embodiment

Figure 10:
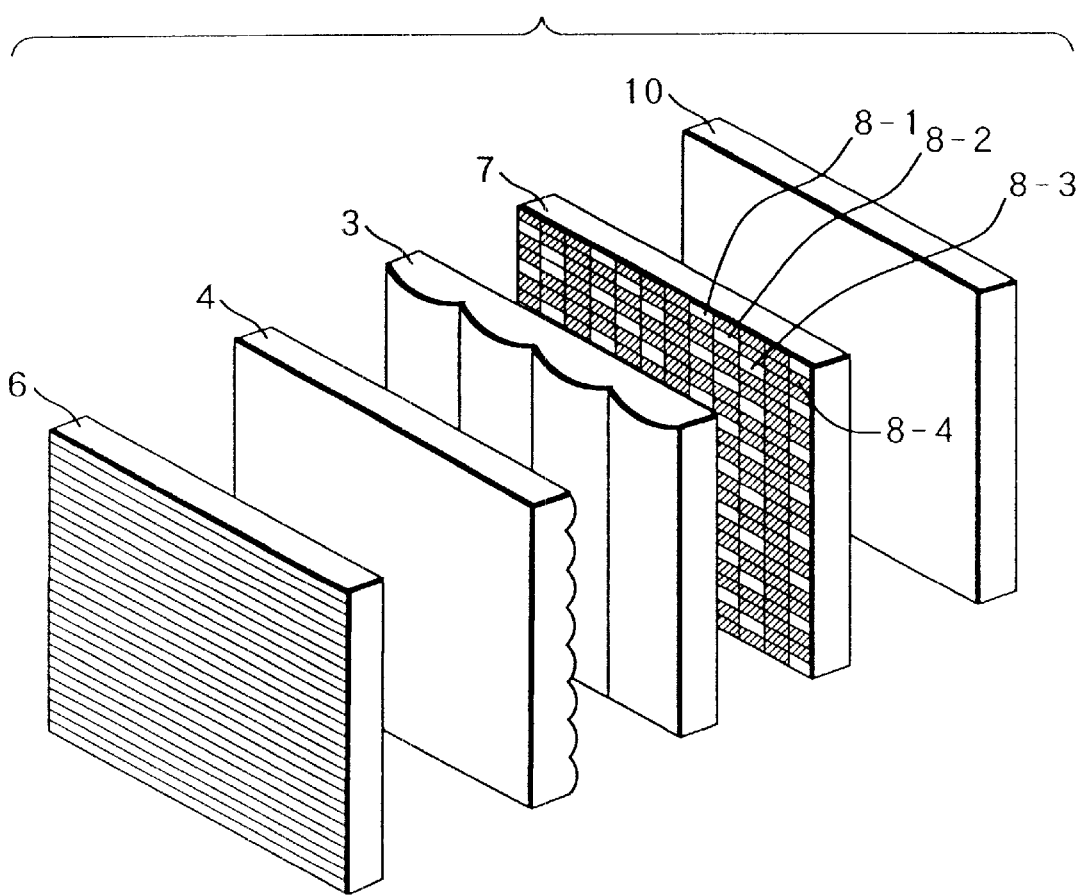
FIG. 10 is a perspective view showing principal part of the second embodiment of the present invention.

FIG. 10 is a perspective view showing principal part of the second embodiment of the present invention. This embodiment adopts an arrangement for preventing inverse stereoscopic viewing that takes place when parallax images that are respectively to reach the right and left eyes of the observer reach the left and right eyes depending on the head position of the observer. Since many portions of this embodiment are the same as those in the first embodiment, only different portions will be described in detail, and a description of common portions will be simplified or omitted.

In the first embodiment shown in FIG. 9, inverse stereoscopic viewing occurs at the observation positions P3 and P4. In order to prevent this, when the observer is located at the position P3 (P4), light need only be prevented from reaching a viewing position E3a (E1a) where the left eye (right eye) is located. More specifically, dark portions that can intercept illumination light need only be formed on repeat start portions of a series of N viewing position illumination regions corresponding to the number N of viewing positions, i.e., on the regions of the viewing position (E1a) and (E3a). The horizontal width of the dark portion is preferably larger than 65 mm, which is the average value of the interval between the two eyes of human beings.

FIG. 10 shows the arrangement for displaying parallax images from three viewing positions at three observation positions, and preventing inverse left and right parallax images from reaching the right and left eyes.

Figure 11:
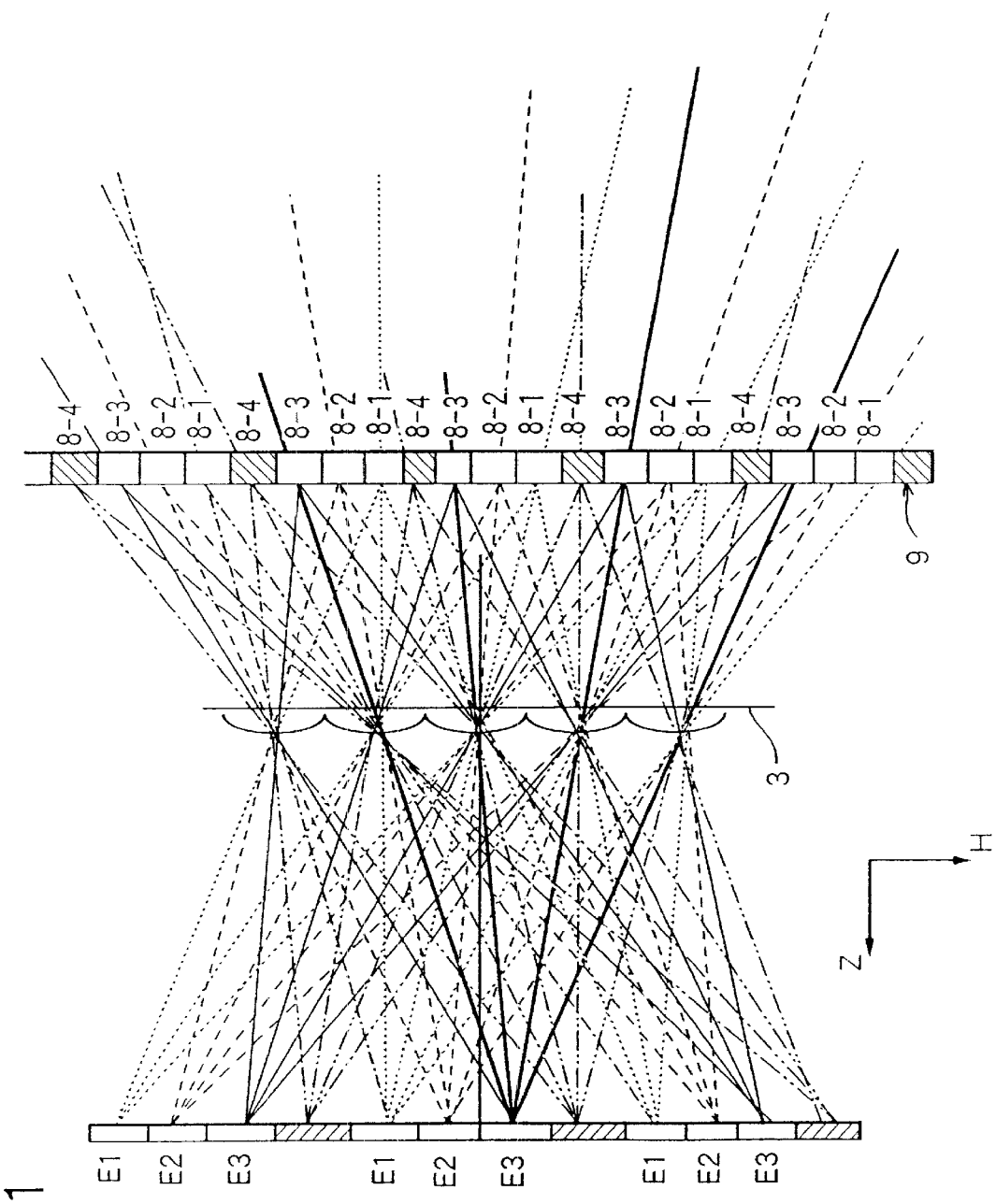
FIG. 11 is a view for explaining an H-Z section in FIG. 10.

FIG. 11 shows the section when the stereoscopic image display apparatus of this embodiment is viewed from the above. The pitches of a first lenticular lens 3 and mask pattern 9 are the same as those used when the number of viewing positions is increased from 3 to 4 in the above first embodiment. That is, when the distance between the two eyes is set at E=65 mm, the horizontal pitch HL of the first lenticular lens 3 is determined by relations (1) and (2) described previously if Lh1 is the optical distance between the mask pattern 9 and first lenticular lens 3, Lh0 is the optical distance from the first lenticular lens 3 to the observation surface, HL is the horizontal pitch of the first lenticular lens 3, Hm is the horizontal pitch of the mask pattern 9, and D is the separation distance between adjacent viewing positions on the observation surface. In the arrangement in which D=E, aperture lines (line patterns) for three out of four viewing positions, e.g., aperture lines for the first, second, and third viewing positions repetitively appear in the vertical direction on the mask pattern 9.

FIG. 11 illustrates apertures 8-1, 8-2, 8-3, and 8-4 as aperture positions on the mask pattern 9 corresponding to the first, second, third, and fourth viewing positions in a single plane for the sake of simplicity, as in FIG. 9. However, in practice, the apertures 8-4 corresponding to the fourth viewing position are light-shielding portions, and aperture arrays 8-1, 8-2, and 8-3 corresponding to the first, second, and third viewing positions are alternately arranged in the direction perpendicular to the plane of drawing.

Figure 12:
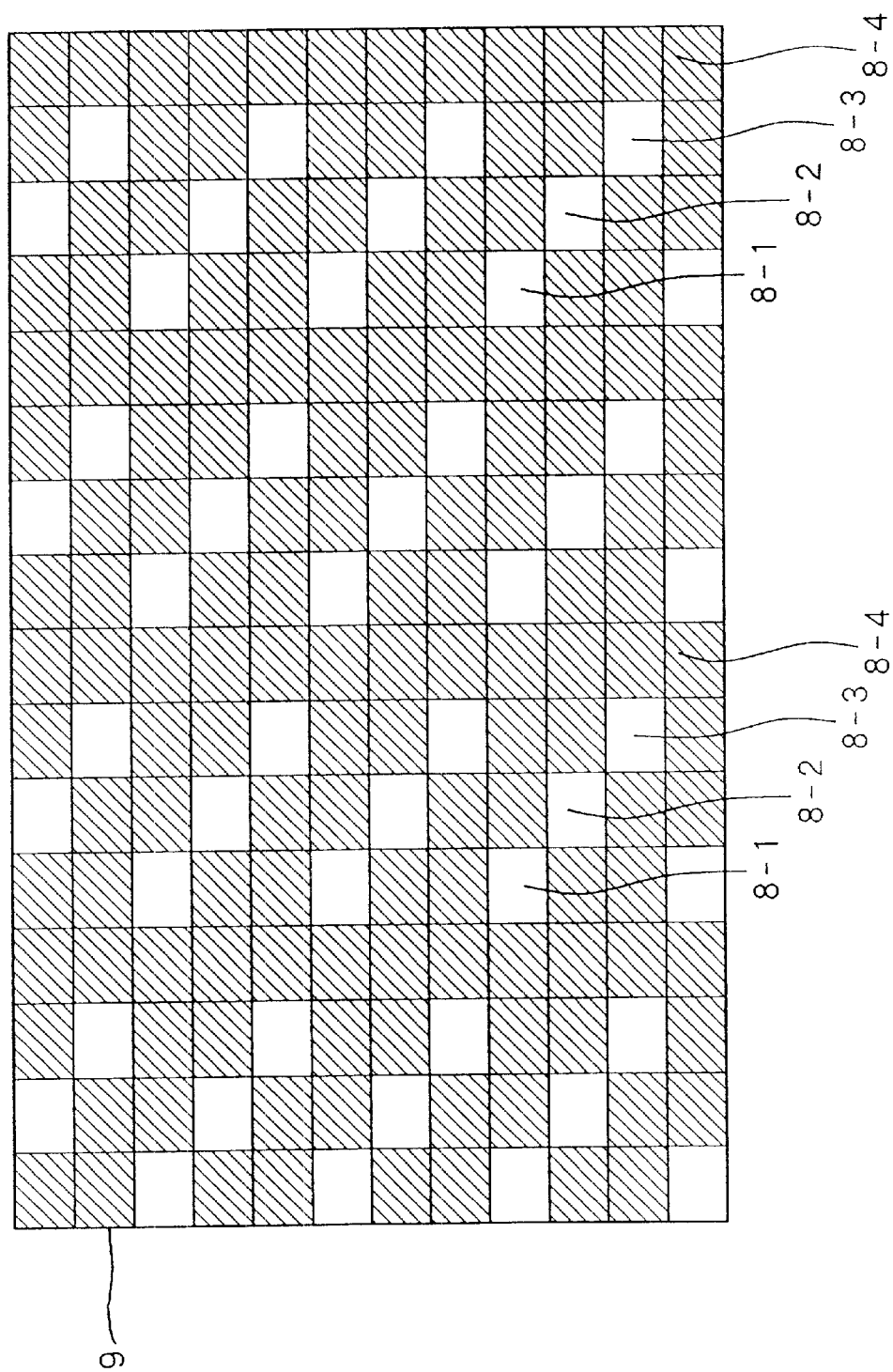
FIG. 12 is a view for explaining a mask pattern used in a stereoscopic image display apparatus shown in FIG. 10.

FIG. 12 is an explanatory view of the mask pattern 9 at that time. A horizontal stripe synthesized image displayed on a transmission type LCD 6 is synthesized by dividing parallax images IM1, IM2, and IM3 respectively corresponding to viewing positions E1, E2, and E3 into a large number of horizontal stripe parallax images and cyclically arranging them in the vertical direction.

The relationship between a second lenticular lens 4 and the mask pattern 9 on a mask substrate 7 is the same as that in the first embodiment shown in FIG. 7, and in the vertical direction, line patterns for the first, second, and third viewing positions in the vertical direction displayed on the liquid crystal display 6 correspond to three parallax images as cyclically arranged horizontal stripe parallax images. Let Vm be the vertical pitch of the apertures on the mask pattern, Vl be the pitch of the second lenticular lens 4, fv be the focal length of each cylindrical lens that forms the second lenticular lens 4 within the plane of drawing in FIG. 7, Vd be the vertical pixel pitch of the liquid crystal display 6, L1 be the distance from the display surface of the liquid crystal display to the second lenticular lens 4, L2 be the distance from the second lenticular lens 4 to the mask pattern 9, N be the number of viewing positions, and N2 be the number of viewing positions where dark portions are to be formed, of the N viewing position. Then, the individual parameters are set to satisfy:

$$Vd:Vm=L1:L2 \quad (6)$$

$$Vd(N-N2):VL=(L1+L2)/2:L2 \quad (7)$$

$$1/fv=1/L1+1/L2 \quad (8)$$

With such setups, all light beams coming from aperture portions 8-1 of line patterns for the first viewing position illuminate image lines IM1 for the first viewing position on the LCD 6, all light beams coming from aperture portions 8-2 of line patterns for the second viewing position illuminate image lines IM2 for the second viewing position on the LCD 6, and all light beams coming from aperture portions 8-3 of line patterns for the third viewing position illuminate image lines IM3 for the third viewing position on the LCD 6. After that, these light beams diverge vertically in accordance with their NA(numerical aperture)s upon focusing, so that parallax images at the individual viewing positions can be observed over the range broadened in the vertical direction of the observation surface.

In this embodiment, illumination portions of the first, second, and third viewing positions on the observation surface are repetitively formed to sandwich dark portions each having a horizontal width of 65 mm corresponding the fourth viewing position where no illumination light reaches, and no inverse stereoscopic viewing occurs independently of the head position of the observer.

As described above, the arrangement for preventing inverse stereoscopic viewing that takes place when the right and left parallax images reach the left and right eyes of the observer depending on the observer's head position can be realized, and the observer can satisfactorily observe a plurality of stereoscopic images from a plurality of positions by appropriately setting individual elements such as two lenticular lenses having refractive power in orthogonal directions, a mask pattern on which aperture portions and light-shielding portions are arranged at predetermined pitches, a display for dividing a plurality of parallax images into a large number of horizontal stripe-shaped parallax images and displaying the plurality of horizontal stripe-shaped parallax images at predetermined pitches in the vertical direction, and the like, upon observing a stereoscopic image using the lenticular lenses.

Third Embodiment

Figure 13:
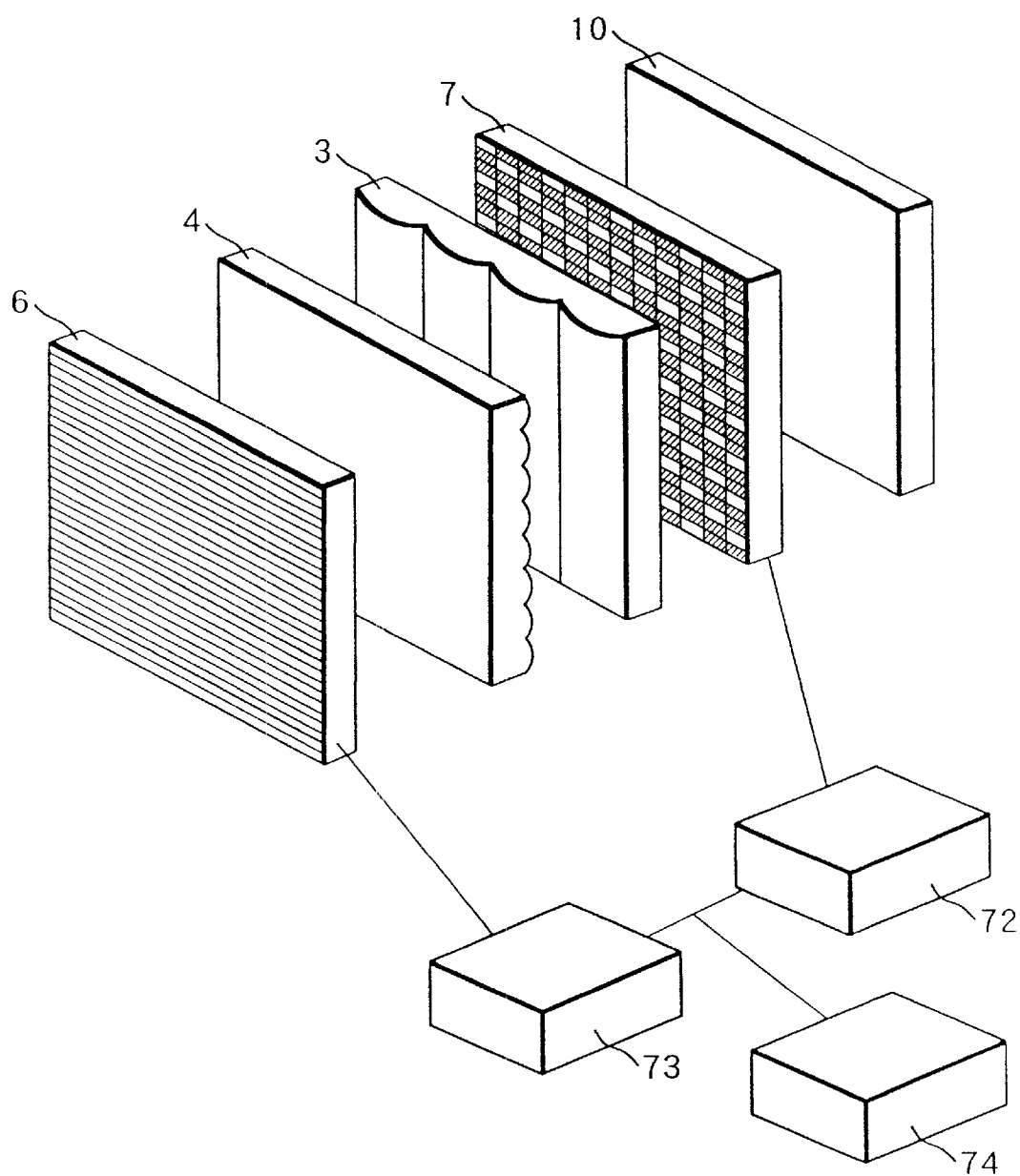
FIG. 13 is a perspective view showing principal part of the third embodiment of the present invention.

FIG. 13 is a perspective view showing principal part of the third embodiment of the present invention. The first embodiment described previously uses the mask substrate 7 having the mask patterns 9 with predetermined apertures as an aperture pattern. Instead, this embodiment uses a transmission type spatial light modulation element 71 such as a transmission type liquid crystal element. Other portions are the same as those in the first embodiment.

An image processing apparatus 74 generates horizontal stripe synthesized image data by extracting horizontal stripe parallax images of a three-dimensional object from a plurality of images (not shown) and synthesizing them, and displays the generated image data on a display pixel portion of a liquid crystal display 6 for displaying an image via a display driving circuit 73. At the same time, the apparatus 74 displays aperture pattern data corresponding to that image data on a spatial light modulation element 71 via a spatial light modulation element driving circuit 72.

The method of displaying parallax images in this embodiment will be described below with reference to FIGS. 14A, 14B, and 14C, and FIGS. 15A, 15B, and 15C.

Figure 14A:
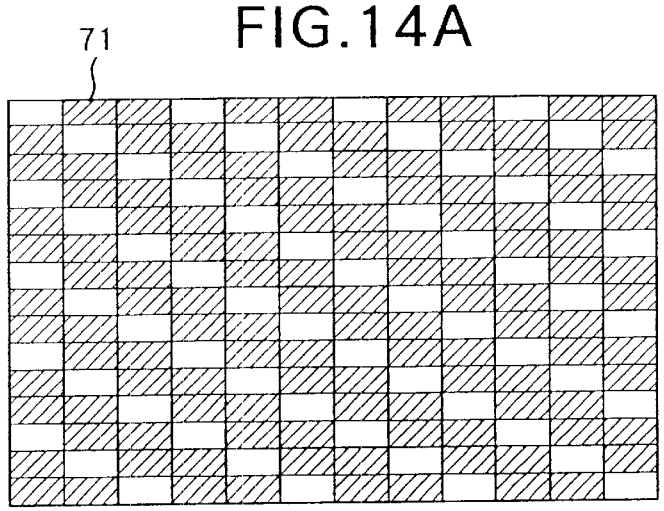
FIG. 14A is a view for explaining a mask pattern used in a stereoscopic image display apparatus shown in FIG. 13.
Figure 14B:
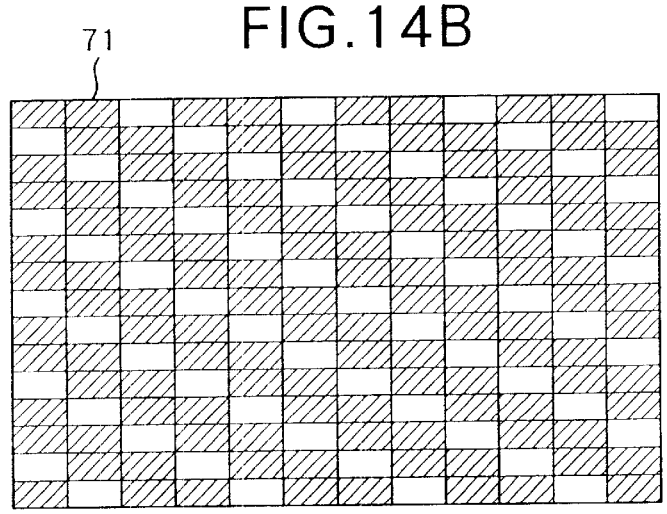
FIG. 14B is a view for explaining another mask pattern used in the stereoscopic image display apparatus shown in FIG. 13.
Figure 14C:
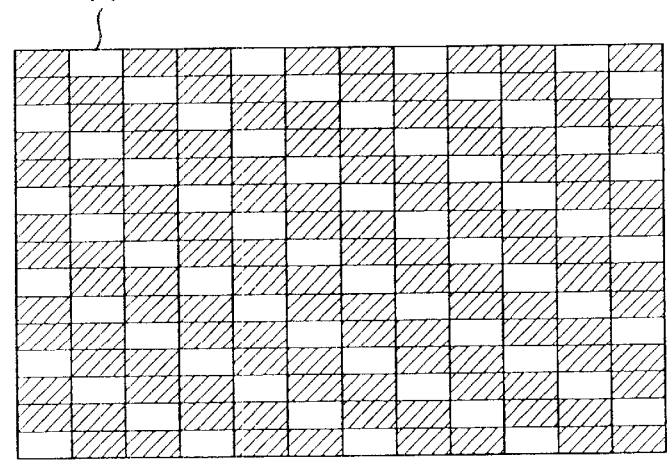
FIG. 14C is a view for explaining still another mask patter used in the stereoscopic image display apparatus shown in FIG. 13.

FIGS. 14A, 14B, and 14C respectively show patterns of light-transmitting and light-shielding portions of the spatial light modulation element 71, and FIGS. 15A, 15B, and 15C respectively show parallax images displayed on the display pixel portion of the liquid crystal display 6. The display pixel portion of the liquid crystal display 6 displays horizontal stripe parallax images obtained by cyclically synthesizing three parallax images.

When the pattern shown in FIG. 14A of the spatial light modulation element 71 is used, the LCD 6 displays a first horizontal stripe synthesized image synthesized so that a first viewing position image IM1 is displayed on the first scan line, a second viewing position image IM2 on the second scan line, a third viewing position image IM3 on the third scan line, . . . , as shown in FIG. 15A.

On the other hand, when the pattern shown in FIG. 14B of the spatial light modulation element 71 is used, the LCD 6 displays a second horizontal stripe synthesized image synthesized so that a second viewing position image IM2 is displayed on the first scan line, a third viewing position image IM3 on the second scan line, a first viewing position image IM1 on the third scan line, . . . , as shown in FIG. 15B. Furthermore, when the pattern shown in FIG. 14C of the spatial light modulation element 71 is used, the LCD 6 displays a third horizontal stripe synthesized image synthesized so that a third viewing position image IM3 is displayed on the first scan line, a first viewing position image IM1 on the second scan line, a second viewing position image IM2 on the third scan line, . . . , as shown in FIG. 15C.

With this arrangement, the corresponding parallax images are separately observed at the respective viewing position positions. Although the vertical spatial resolution of each parallax image drops to ⅓ as a result of stripe synthesis, since images in such state are time-divisionally and cyclically displayed, a high-resolution image can be displayed without any drop of vertical resolution.

When the display pixel portion of the liquid crystal display 6 has a different rewrite speed from that of the spatial light modulation element 71, a rewrite is done by synchronizing the display driving circuit 73 and spatial light modulation element driving circuit 72, so as to conceal boundaries from the observer by matching the image rewrite timing with the aperture pattern rewrite timing.

In this case, data may be synchronously rewritten in units of pixels on the corresponding scan lines of the display pixel portion of the liquid crystal display 6 and the spatial light modulation element 71, or may be rewritten in units of corresponding scan lines.

In a normal stereoscopic display method for time-divisionally displaying three, first, second, and third parallax images in units of frames, the frame frequency must be raised to about 180 Hz so as to prevent flickering. However, in the method of this embodiment, since each frame is formed by synthesizing three parallax images as horizontal stripe parallax images, a high-resolution stereoscopic image can be observed without any flickering even when the frame frequency is as low as 60 Hz.

This embodiment has an arrangement that satisfies Vd=Vm=VL/3, L1=L2, and fv=L1/2 as in the first embodiment when Vm is the vertical pitch of apertures 8 on the mask pattern 9, VL is the pitch of a second lenticular lens 4, fv is the focal length of each cylindrical lens that forms the second lenticular lens 4 in a direction in the VZ section, Vd is the pixel pitch on the liquid crystal display 6 in the vertical direction (V), L1 be the distance from the display surface of the liquid crystal display 6 to the second lenticular lens 4, and L2 be the distance from the second lenticular lens 4 to the mask pattern 9.

Since Vd=Vm, an LCD having the same pixel pitch as that of the liquid crystal display for displaying an image can be used as the spatial light modulation element.

In this embodiment, as in the first embodiment, when the observer's head is located at an observation position P1 in FIG. 9, an image IM1 corresponding to the first viewing position reaches the left eye, and an image IM2 corresponding to the second viewing position reaches the right eye. As a consequence, the observer can observe a stereoscopic image similar to that obtained when his or her head is located between TV cameras 51 and 52 in FIG. 8. By contrast, when the observer's head is located at an observation position P2, an image IM2 corresponding to the second viewing position reaches the left eye, and an image IM3 corresponding to the third viewing position reaches the right eye. Hence, the observer can observe a stereoscopic image similar to that obtained when his or her head is located between TV cameras 52 and 53 in FIG. 8.

Also, when this embodiment adopts two lenticular lenses and the pattern of the light-transmitting and light-shielding portions of the spatial modulation element 71 which are the same as those in the second embodiment, and switches images and the pattern of the light-transmitting and light-shielding portions, an arrangement for preventing any inverse stereoscopic viewing can be adopted as in the second embodiment.

Fourth Embodiment

Figure 16:
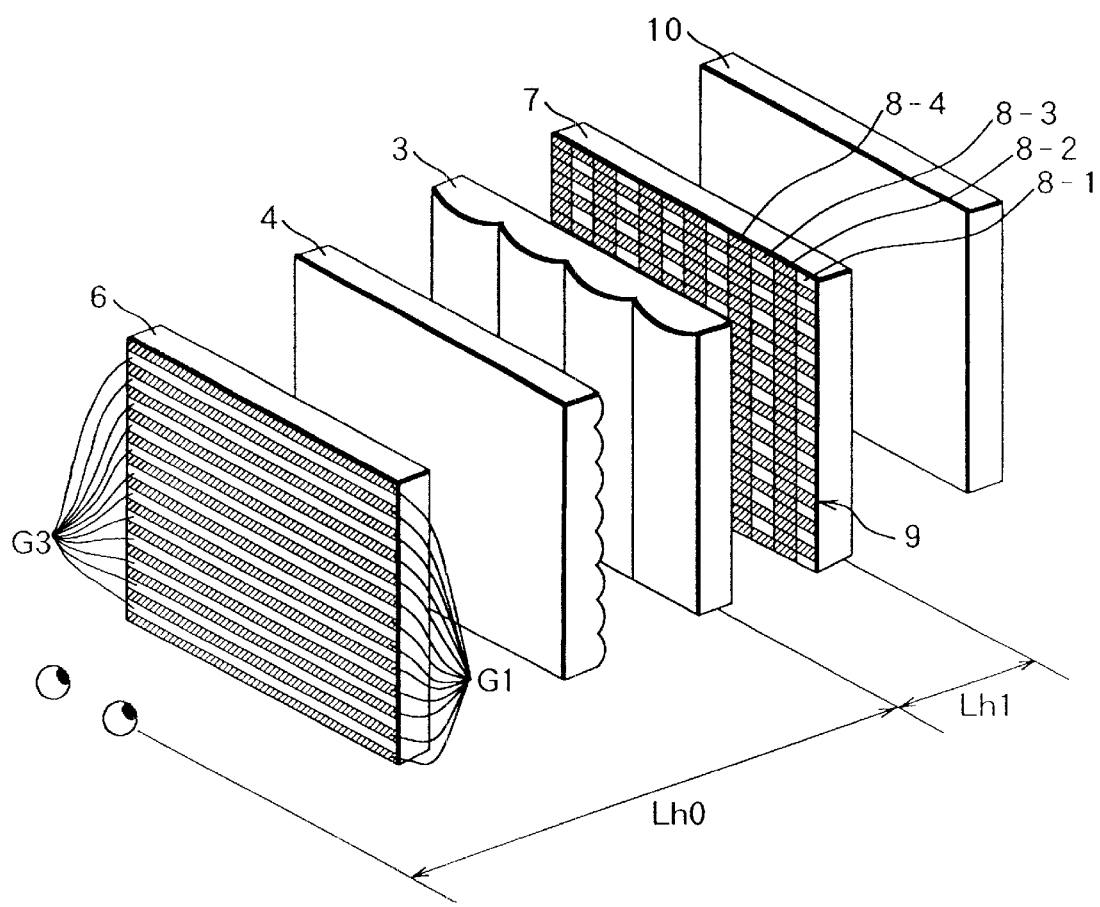
FIG. 16 is a perspective view showing principal part of the fourth embodiment of the present invention.

FIG. 16 is a perspective view showing principal part of the fourth embodiment of the present invention. This embodiment exemplifies a case wherein a plurality of different plane images (2D images) are observed in place of a stereoscopic image using the basic arrangement of the first embodiment shown in FIG. 1.

This embodiment has an arrangement for preventing unnatural feeling experienced when different images reach the right and left eyes of the observer depending on the head position of the observer, upon displaying a plurality of 2D images on a display. Since many portions of this embodiment are the same as those in the first embodiment, only different portions will be described in detail, and a description of common portions will be simplified or omitted.

In FIGS. 2 to 4, the right and left eyes of the observer may be located in illumination regions corresponding to different viewing positions. At this time, the observer observes different viewing position images by the right and left eyes. If the individual viewing position images have no relation at all, the observer recognizes them not as a stereoscopic image but as double images, thus experiencing unnatural feeling.

This embodiment can prevent such unnatural feeling, and dark portions are formed between adjacent viewing position illumination regions each for satisfactorily observing a 2D image. The horizontal width of the dark portion at that time is preferably larger than 65 mm, which is the average value of the interval between the two eyes of human beings.

FIG. 16 shows an arrangement that allows the observer to independently observe two different 2D images G1 and G3 at two different observation positions, and can prevent the two different 2D images G1 and G3 from simultaneously reaching the two eyes.

Figure 17:
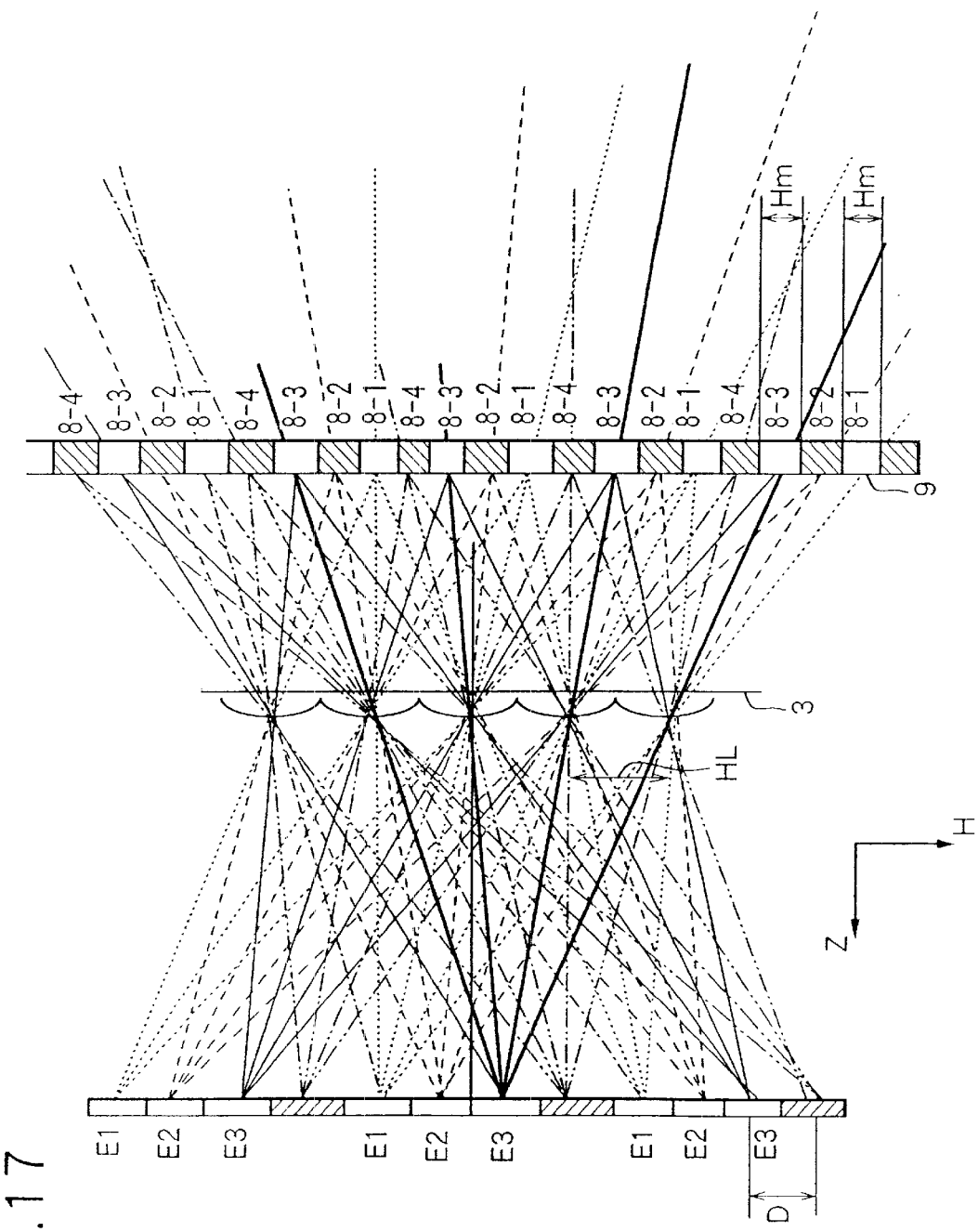
FIG. 17 is a view for explaining an H-Z section in FIG. 16.

FIG. 17 shows a section (H-Z section) when the image display apparatus of the fourth embodiment shown in FIG. 16 is viewed from the above (direction V). In FIG. 17, the pitches of a first lenticular lens 3 and apertures 8 of a mask pattern 9 are the same as those used when the number of viewing positions is increased from 3 to 4 in the first embodiment. That is, when the distance between the two eyes is set at E=65 mm, the horizontal pitch HL of the first lenticular lens 3 is determined by:

$$D:Hm = Lh0:Lh1 \quad (9)$$

$$Hm \cdot N:HL = Lh0 + Lh1:Lh0 \quad (10)$$

where Lh1 is the optical distance between the mask pattern 9 and first lenticular lens 3, Lh0 is the optical distance from the first lenticular lens 3 to the observation surface, HL is the horizontal pitch of the first lenticular lens 3, Hm is the horizontal pitch of the mask pattern 9, and D is the separation distance between adjacent viewing positions on the observation surface.

The arrangement in which D=E corresponds to line patterns obtained by repeating, in the vertical direction, apertures for two non-neighboring viewing positions, e.g., apertures 8-1 and 8-3 for the first and third viewing positions, of apertures 8-1 to 8-4 for the four viewing positions on the mask pattern.

FIG. 17 shows aperture positions 8-1, 8-2, 8-3, and 8-4 on the mask pattern 9 corresponding to the first, second, third, and fourth viewing positions in a single plane for the sake of simplicity. In practice, apertures 8-2 and 8-4 corresponding to the second and fourth viewing positions are light-shielding portions, and line patterns of apertures 8-1 and 8-3 corresponding to the first and third viewing positions are alternately arranged in the direction perpendicular to the plane of drawing.

Figure 18:
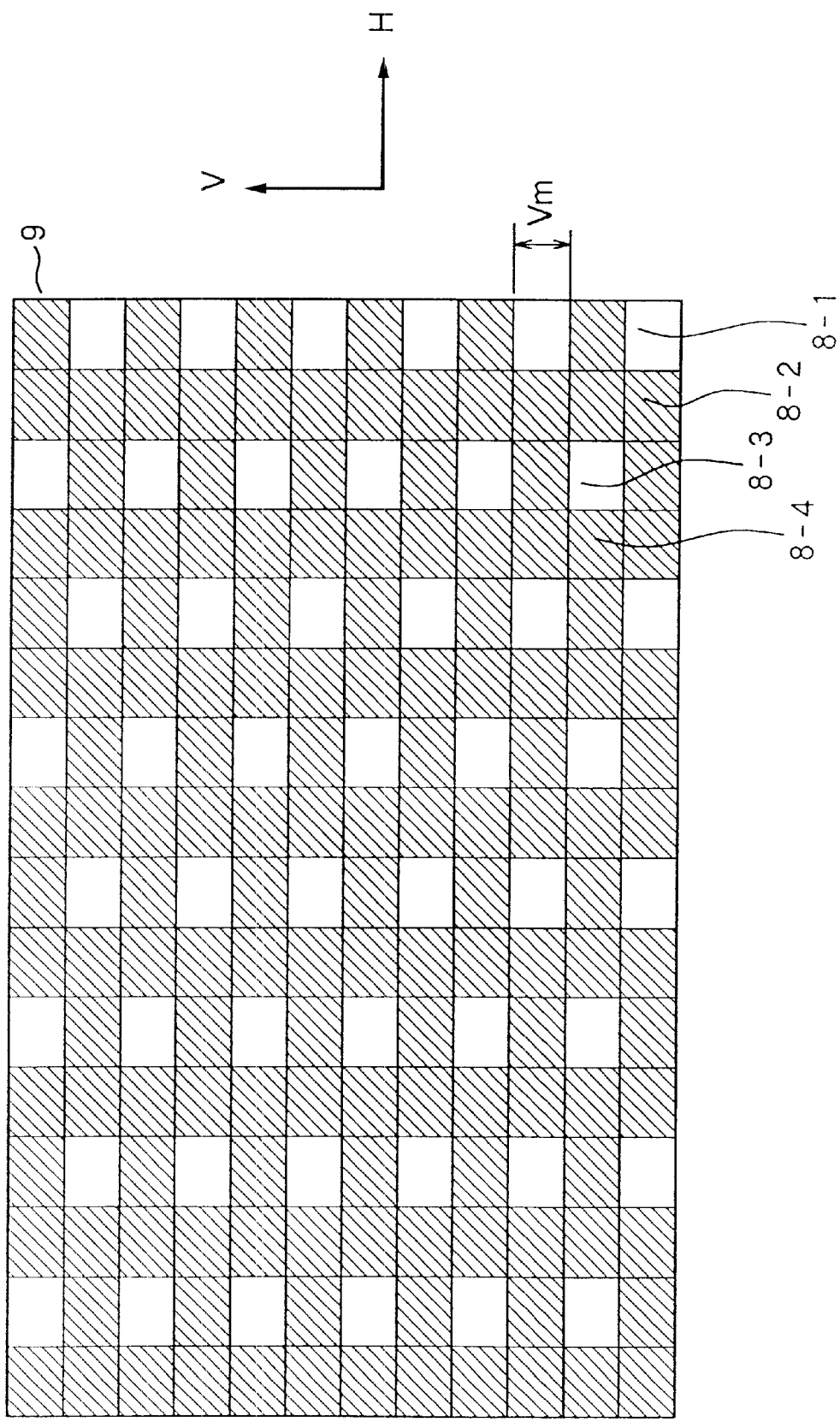
FIG. 18 is a view for explaining a mask pattern used in a stereoscopic image display apparatus shown in FIG. 16.

FIG. 18 is an explanatory view of the mask pattern 9 at that time. A synthesized stripe image displayed on a transmission type LCD 6 is obtained by alternately arranging images G1 and G3 corresponding to viewing positions E1 and E3 as horizontal lines.

Figure 19:
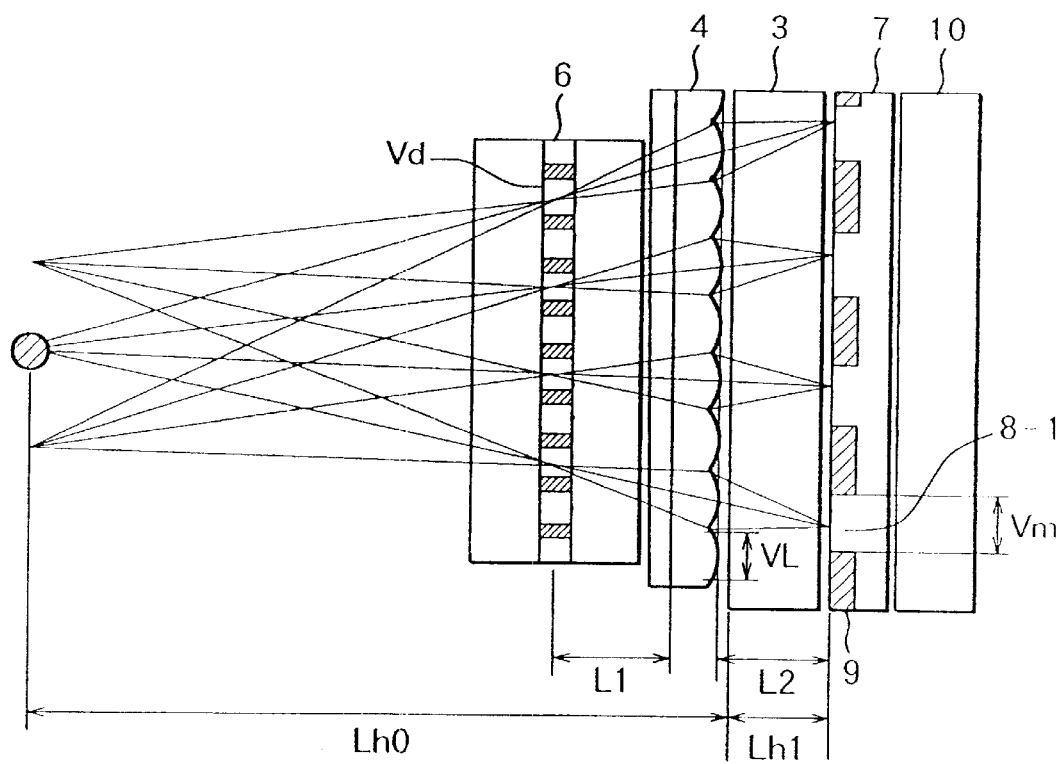
FIG. 19 is a view for explaining a V-Z section in FIG. 16.
Figure 20:
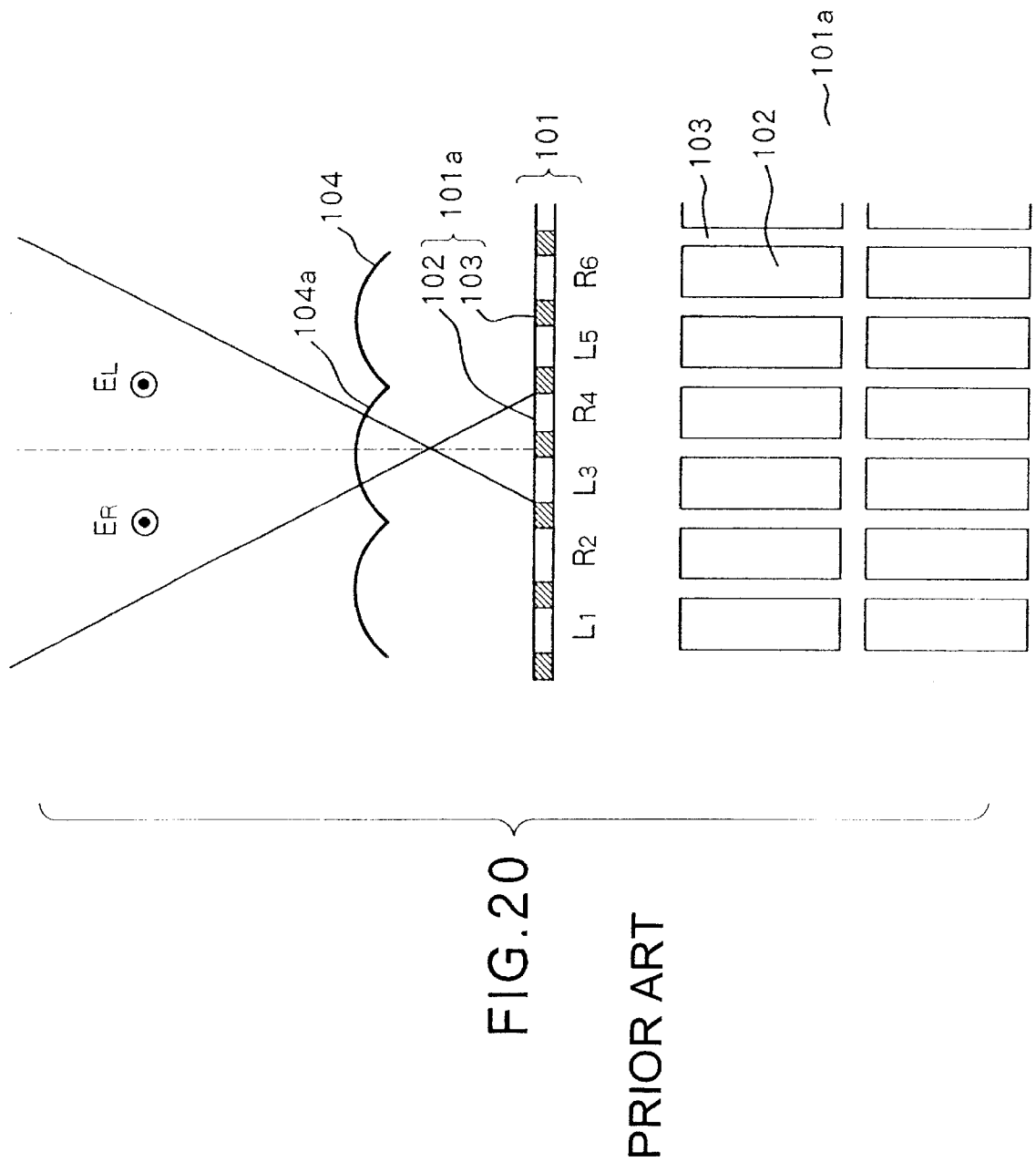
FIG. 20 is a schematic sectional view for explaining principal part of a conventional stereoscopic image display apparatus.

FIG. 19 schematically shows a vertical section (V-Z section) of the image display apparatus of this embodiment. The vertical observation region will be explained below with the aid of FIG. 19. In FIG. 19, the first lenticular lens 3 having no optical effect in this section is illustrated as a flat plate, the substrate consisting of plane glass which is not directly associated with any optical effect is not shown, and the second lenticular lens 4 is schematically illustrated. Apertures 8-1 on the mask pattern 9 of a mask substrate 7 form a pattern shown in FIG. 18, and in the vertical direction, image lines G1 and G3 for the first and third viewing positions in the vertical direction displayed on the liquid crystal display 6 correspond to two alternately arranged horizontal stripe-shaped images. Let Vm be the vertical pitch of the apertures 8 on the mask pattern 9, VL be the pitch of the lenticular lens 4, fv be the focal length of each cylindrical lens that forms the second lenticular lens 4 within the plane of drawing of FIG. 7, Vd be the vertical pixel pitch on the liquid crystal display 6, L1 be the distance from the display surface of the liquid crystal display 6 to the second lenticular lens 4, and L2 be the distance from the second lenticular lens 4 to the mask pattern 9. Then, these parameters are set to satisfy:

$$0.95 < (Vd/Vm)/(L1/L2) < 1.05 \quad (11)$$

$$0.96 < (2 \times Vd/Vl)/\{(L1+L2)/2 \times L2\} < 1.04 \quad (12)$$

$$0.9 < (1/fv)/(1/L1+1/L2) < 1.1 \quad (13)$$

With this setup, all light beams coming from the aperture portions 8-1 on aperture lines for the first viewing position illuminate image lines G1 for the first viewing position on the LCD 6, and all light beams coming from aperture portions 8-3 on aperture lines for the third viewing position illuminate image lines G3 for the third viewing position on the LCD 6. After that, these light beams diverge vertically in accordance with their NA(numerical aperture)s upon focusing, so that images at the individual viewing positions can be observed over the range broadened in the vertical direction of the observation surface.

In this embodiment, since illumination portions on the observation surface for the first and third points are alternately located to sandwich dark portions having a horizontal width of 65 mm and corresponding to the second and fourth viewing positions, the observer can be prevented from simultaneously observing images G1 and G3 for the first and third viewing positions with the right and left eyes. Hence, two 2D images can be independently observed at different positions.

As many apparently widely different embodiments of the present invention can be made without departing from the spirit and scope thereof, it is to be understood that the invention is not limited to the specific embodiments thereof except as defined in the appended claims.

What is claimed is:

1. An image display apparatus for allowing observation of image information, comprising:
   a light source device;
   a mask pattern which has line patterns each obtained by repetitively arranging N−1 or N light-shielding portions with respect to one aperture portion in a horizontal direction, and has sets each of which includes N line patterns shifted from each other in the horizontal direction by a width of the aperture portion, and which are repetitively arranged in the vertical direction;
   a first lenticular lens formed by arranging a plurality of cylindrical lenses, having refractive power in the horizontal direction, at a predetermined pitch in the horizontal direction;
   a second lenticular lens formed by arranging a plurality of cylindrical lenses, having refractive power in the vertical direction, at a predetermined pitch in the vertical direction; and
   a display for displaying image information, said display being illuminated by a light beam which is emitted by said light source device, transmitted through the plurality of aperture portions, and passes through said first and second lenticular lenses, and the image information having a horizontal stripe synthesized image obtained by respectively dividing N images into a plurality of horizontal stripe images, and repetitively arranging the divided horizontal stripe images in a predetermined order in correspondence with the N images at a predetermined pitch in the vertical direction;
   wherein $N \geq 3$ and, wherein said first and second lenticular lenses serve to make a light beam coming from one point of the aperture portion of said mask pattern reach a surface of said display to be converted into a collimated light beam in the horizontal direction and to be substantially focused in the vertical direction.

2. The apparatus according to claim 1, wherein said apparatus satisfies:

$$0.95 < (Vd/Vm)/(L1/L2) < 1.05$$

$$0.96 < (N \times Vd/VL)/\{(L1+L2)/2 \times L2\} < 1.04$$

$$0.9 < (1/fv)/(1/L1+1/L2) < 1.1$$

where VL is the vertical arrangement pitch of said plurality of cylindrical lenses of said second lenticular lens, Vd is the vertical arrangement pitch of the plurality of horizontal stripe parallax images to be displayed on said display, Vm is the vertical arrangement pitch of the plurality of line patterns of said mask pattern, L1 is the optical distance from said display to said second lenticular lens, L2 is the optical distance from said second lenticular lens to said mask pattern, and fv is the focal length of said second lenticular lens in the vertical direction.

3. The apparatus according to claim 1, wherein said N images are N parallax images for N viewing positions, and said apparatus satisfies:

$$0.9 < (D/Hm)/(Lh0/Lh1) < 1.1$$

$$0.9 < (N \times Hm/HL)/\{Lh0+Lh1)/Lh0\} < 1.1$$

where Lh1 is the optical distance from said first lenticular lens to said mask pattern, Lh0 is the optical distance from said first lenticular lens to a predetermined observation surface, HL is the horizontal arrangement pitch of said plurality of cylindrical lenses of said first lenticular lens, Hm is the horizontal pitch of the aperture portions of said mask pattern, and D is the separation distance between adjacent focal points of the N parallax images when light beams based on the N parallax images via the aperture portions of said mask pattern are focused on the observation surface.

4. The apparatus according to claim 1, wherein said N images are parallax images for N viewing positions, and said apparatus works as a stereoscopic image display to allow an observer to observe stereoscopic 3D images.

5. The apparatus according to claim 1, wherein N2 is the number of viewing positions, at which aperture positions on said mask pattern are set to shield light, of the number N of viewing positions, and the numbers N and N2 of viewing positions satisfy:

$$0.96 < (Vd/Vm)/(L1/L2) < 1.05$$

$$0.96 < \{(N-N2) \times Vd/VL\}/\{(L1+L2)/2 \times L2\} < 1.04$$

$$0.9 < (1/fv)/(1/L1+1/L2) < 1.1$$

wherein VL is the vertical pitch of said second lenticular lens, Vd is the vertical pitch of a transmission type display, Vm is the vertical pitch of an emission pattern of a spontaneous type display optical element or a mask pattern having aperture and light-shielding portions arranged in a checkerboard pattern, L1 is the distance between the transmission type display and an optical system having a micropatterned structure, L2 is the distance between the optical system having the micropatterned structure, and the checkerboard-like emission pattern of the spontaneous type display optical element or the mask pattern having the aperture and light-shielding portions arranged in the checkerboard pattern, and fv is the focal length of a predetermined horizontally elongated optical unit, which makes up the optical system having the micropatterned structure, in the vertical direction.

6. The apparatus according to claim 1 wherein said plurality of cylindrical lenses forming said lenticular lens serves to make a light beam coming from one point of the aperture portion of said mask pattern condense as one horizontal stripe image on said display.

7. An image display apparatus for allowing observation of image information comprising:

light providing means for providing patterned light, said light providing means including light-existing portions and light-non-existing portions arranged alternately in a horizontal direction to form line unit areas, wherein each of the light-non-existing portions is N−1 or N times the width of one of the light existing portions, wherein the line unit areas are arranged vertically in sets of N line unit areas, wherein each line unit area in a set is shifted horizontally from adjacent line unit areas by a width of a light-existing portion, and wherein the sets are repetitively arranged;

optical means having a plurality of first cylindrical lens functions, having refractive power in the horizontal direction, positioned to respective areas arranged at a predetermined pitch in the horizontal direction, and a plurality of second cylindrical lens functions, having refractive power in the vertical direction, positioned to respective areas arranged at a predetermined pitch in the vertical direction;

display means for displaying image information, said display means being illuminated by a light which is emitted from the light-existing portions of said light providing means and effected by both of the first and second plurality of cylindrical lens functions, and the image information having a horizontal stripe synthesized image obtained by respectively dividing N images into a plurality of horizontal stripe images, and repetitively arranging the divided horizontal stripe images in a predetermined order in correspondence with the N images at a predetermined pitch in the vertical direction;

wherein $N \geq 3$, and wherein said first and second cylindrical lens functions serve to make a light beam coming from one point of the light-existing portion of said light providing means reach a surface of said display to be converted into a collimated light beam in a horizontal direction and to be substantially focused in a vertical direction.

8. The apparatus according to claim 7, wherein said plurality of second cylindrical lens functions serve to make a light beam coming from one point of the light-existing portion of said light providing means condense as one horizontal stripe image on said display means.

* * * * *

UNITED STATES PATENT AND TRADEMARK OFFICE
CERTIFICATE OF CORRECTION

PATENT NO.    : 6,462,871 B1
DATED         : October 8, 2002
INVENTOR(S)   : Hideki Morishima It is certified that error appears in the above-identified patent and that said Letters Patent is hereby corrected as shown below:

<u>Title page,</u>
Item [56], References Cited, U.S. PATENT DOCUMENTS, please insert the following reference which was omitted:
-- 5,936,774   6/1998  Street   359/630 --

<u>Column 1,</u>
Line 65, "right-hand" should read -- right- and --

<u>Column 5,</u>
Line 34, "mask patter" should read -- mask pattern --

Signed and Sealed this

Third Day of June, 2003

JAMES E. ROGAN
*Director of the United States Patent and Trademark Office*